United States Patent
Cohen et al.

(10) Patent No.: US 10,210,137 B2
(45) Date of Patent: Feb. 19, 2019

(54) BINARY MULTIPLIER FOR BINARY VECTOR FACTORIZATION

(71) Applicant: Intel Corporation, Santa Clara, CA (US)

(72) Inventors: Ehud Cohen, Kiryat Motskin (IL); Daniel David Ben-Dayan Rubin, Tel Aviv (IL); Michael Behar, Zichron Yaakov (IL); Dmitri Vainbrand, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 11 days.

(21) Appl. No.: 15/635,716

(22) Filed: Jun. 28, 2017

(65) Prior Publication Data
US 2019/0004997 A1    Jan. 3, 2019

(51) Int. Cl.
*G06F 17/16*  (2006.01)
*G06F 17/17*  (2006.01)

(52) U.S. Cl.
CPC ............ *G06F 17/16* (2013.01); *G06F 17/175* (2013.01)

(58) Field of Classification Search
CPC ................................ G06F 7/5443; G06F 17/16
See application file for complete search history.

(56) References Cited

U.S. PATENT DOCUMENTS

| 2014/0172937 A1* | 6/2014 | Linderman | G06G 7/16 708/607 |
| 2015/0278156 A1* | 10/2015 | Ambai | G06F 17/10 706/12 |
| 2018/0095935 A1* | 4/2018 | Ben-Dayan Rubin | G06F 17/16 |

OTHER PUBLICATIONS

Z. Zhang, T. Li, C. Ding, X. Zhang, "Binary matrix factorization with applications", Proceedings of the 2007 Seventh IEEE International Conference on Data Mining, pp. 391-400, 2007 (Year: 2007).*

\* cited by examiner

*Primary Examiner* — Matthew D Sandifer
(74) *Attorney, Agent, or Firm* — Alliance IP, LLC

(57) ABSTRACT

A processor, including: decode circuitry to decode instructions; a data cache unit including circuitry to cache data for the processor; and an approximate matrix multiplication (AMM) circuit including: a data receptor circuit to receive a weight vector w and an input vector x, both of size N, and a compression regulating parameter n; a factorizer circuit to factorize w into w≈B·s, by computing a binary factorized matrix B of size N×n, and a dictionary vector s of size n; and a binary multiplier circuit to compute w^T x≈(B·s)^T x= ⟦ s^T(B ⟧ ^T x), the binary multiplier circuit comprising a hardware accelerator circuit to compute an array product ⟦ B ⟧ ^T x).

24 Claims, 23 Drawing Sheets

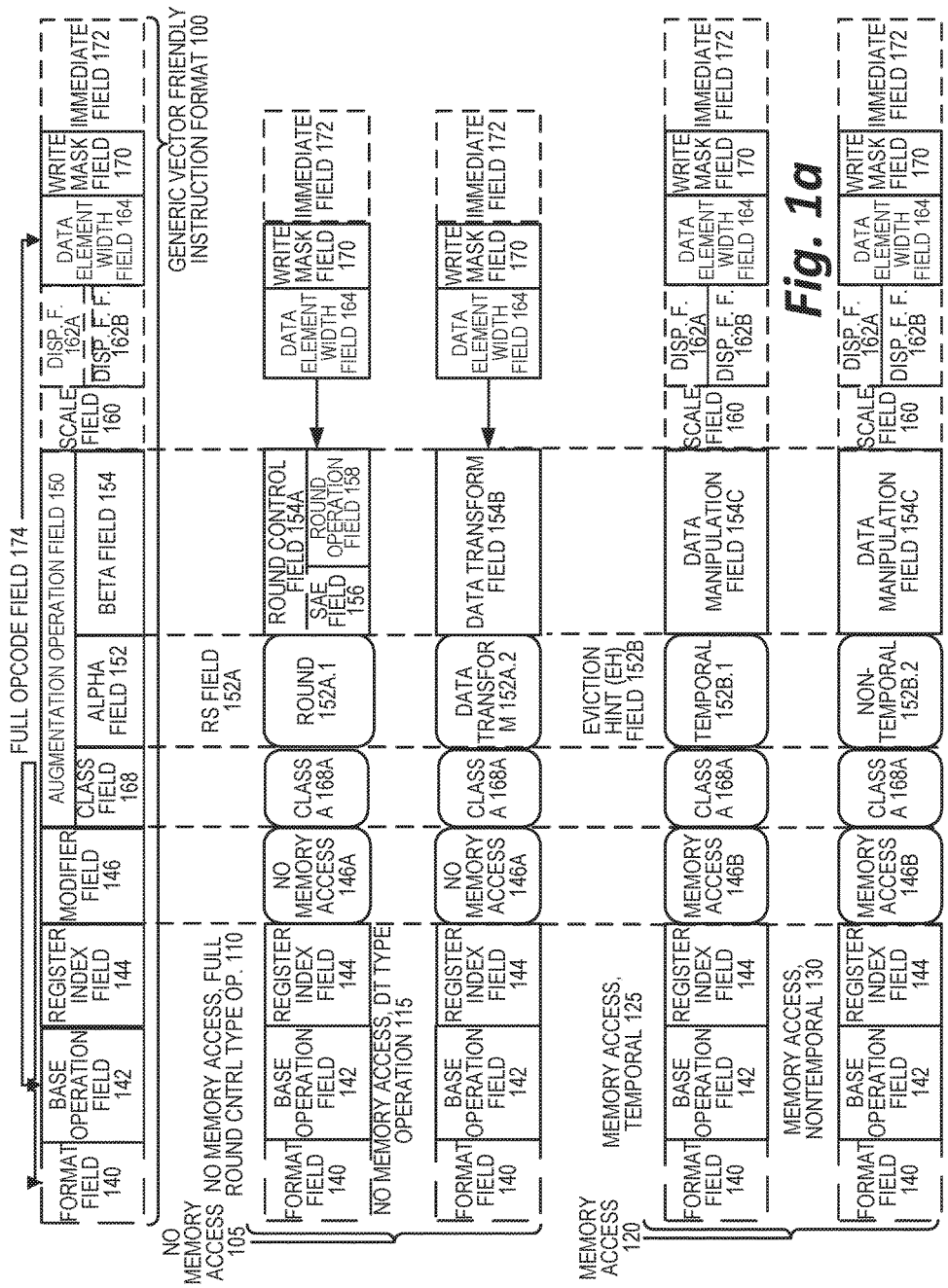

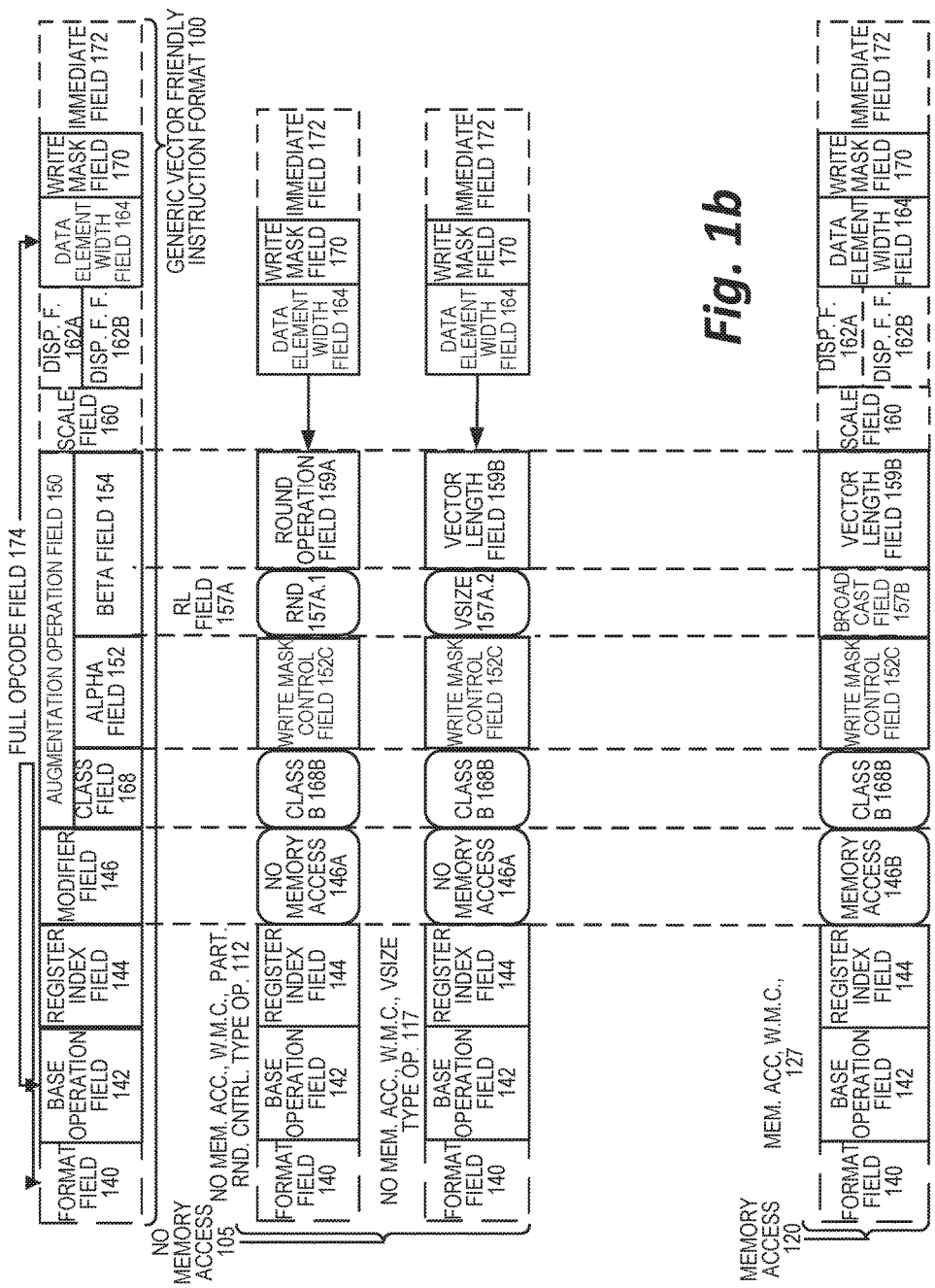

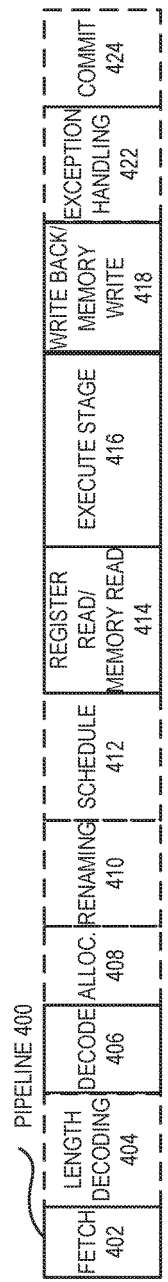
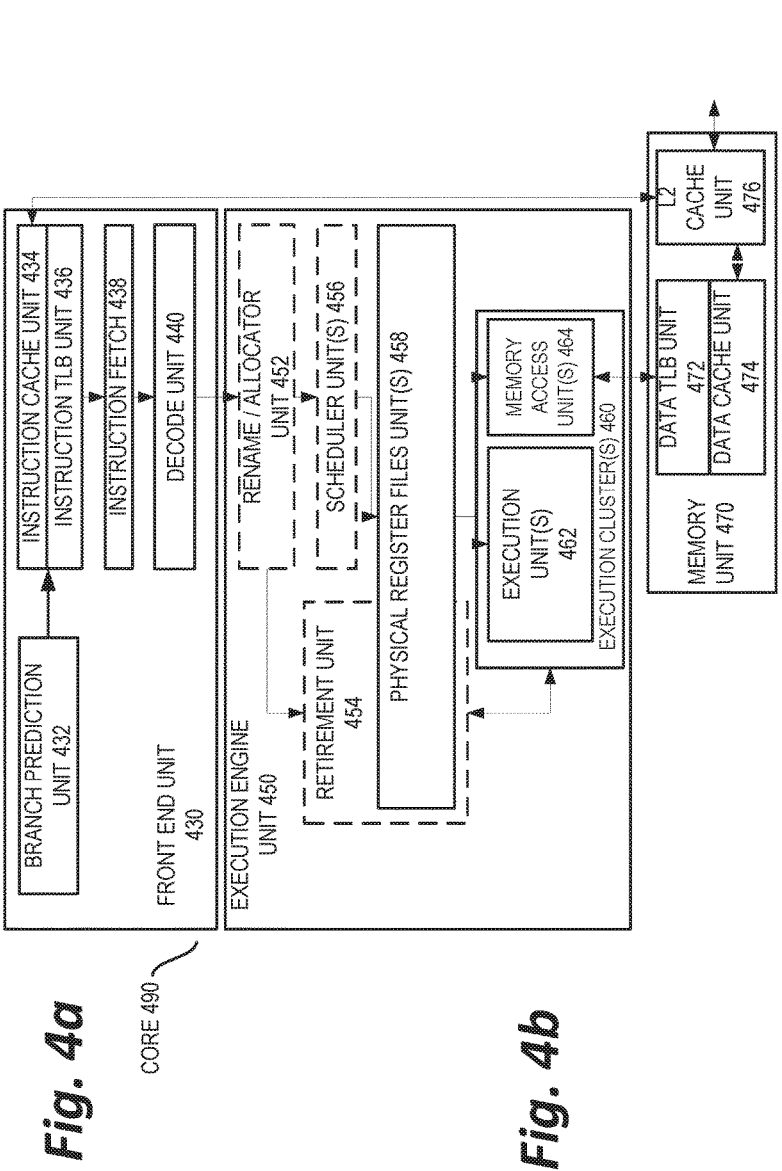
Fig. 4a
Fig. 4b

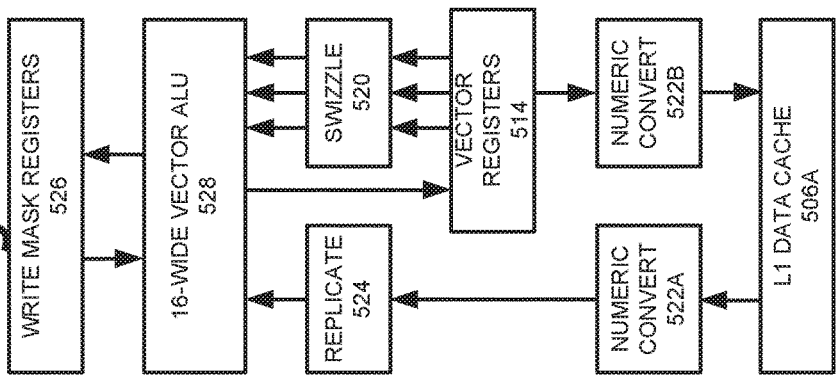
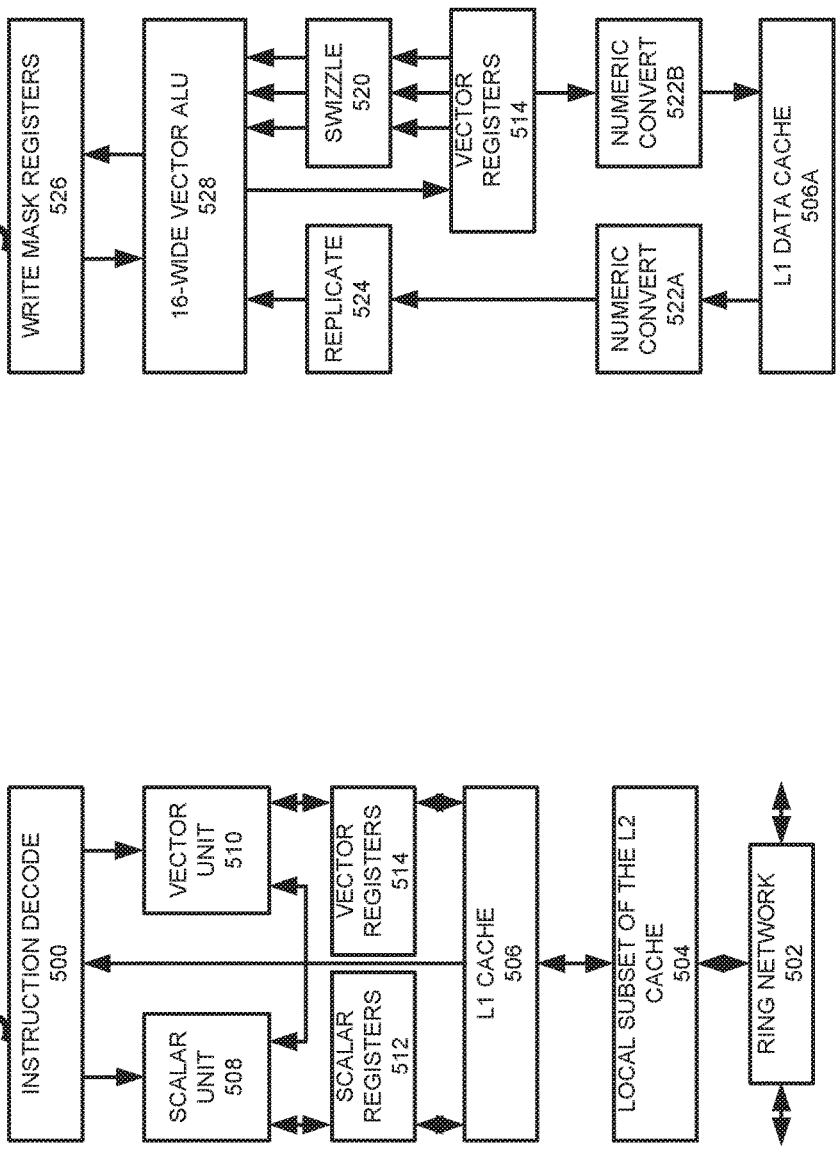

BINARY MULTIPLIER FOR BINARY VECTOR FACTORIZATION

FIELD OF THE SPECIFICATION

This disclosure relates in general to the field of semiconductor devices, and more particularly, though not exclusively, to a system and method for a binary multiplier for binary vector factorization (BVF).

BACKGROUND

Multiprocessor systems are becoming more and more common. In the modern world, compute resources play an ever more integrated role with human lives. As computers become increasingly ubiquitous, controlling everything from power grids to large industrial machines to personal computers to light bulbs, the demand for ever more capable processors increases.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIGS. 1a-1b are block diagrams illustrating a generic vector friendly instruction format and instruction templates thereof according to one or more examples of the present specification.

FIG. 4a is a block diagram illustrating both an example in-order pipeline and an example register-renaming, out-of-order issue/execution pipeline according to one or more examples of the present specification.

FIG. 4b is a block diagram illustrating both an example of an in-order architecture core and an example register-renaming, out-of-order issue/execution architecture core to be included in a processor according to one or more examples of the present specification.

FIGS. 5a-5b illustrate a block diagram of a more specific in-order core architecture, in which the core is one of several logic blocks (including other cores of the same type and/or different types) in a chip according to one or more examples of the present specification.

EMBODIMENTS OF THE DISCLOSURE

Figure 2A:
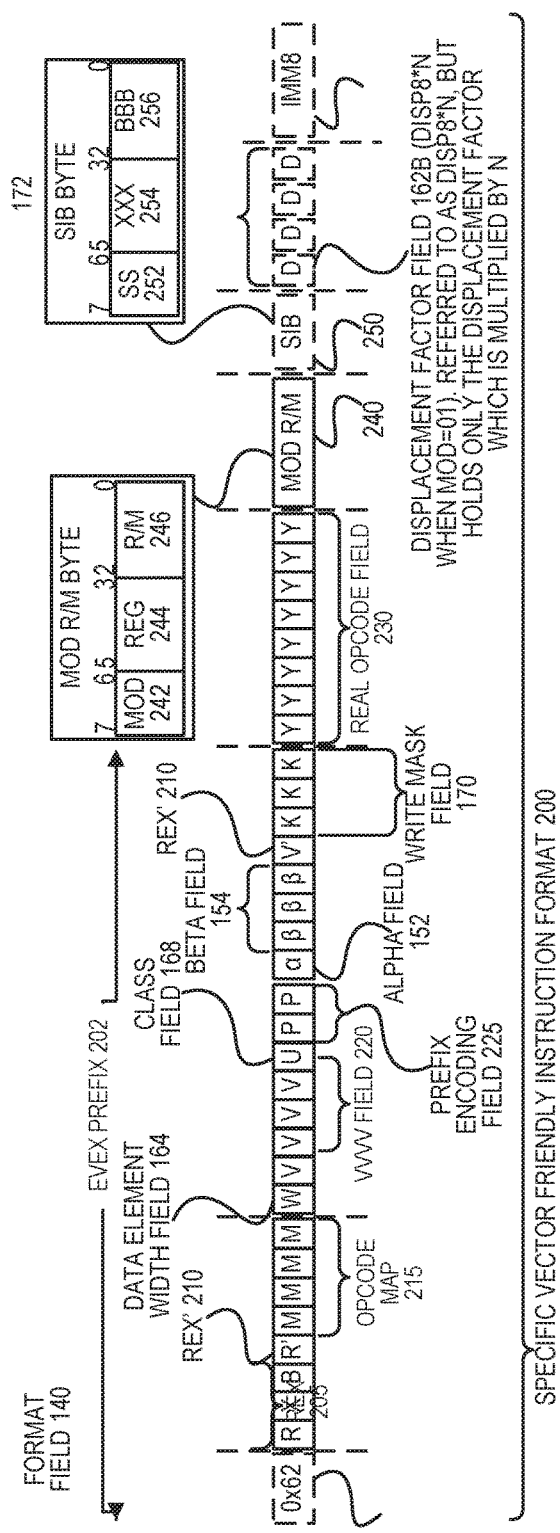
FIGS. 2a-2d are block diagrams illustrating an example specific vector friendly instruction format according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

As computing becomes an increasingly complex task, and the volume of data being handled increases along with the complexity of tasks that are demanded of computers, machine learning and neural networks have become increasingly important. In a general sense, machine learning and neural networks may be implemented using a statistical-based inference engine. In many cases, machine learning is unlike classical computing problems, wherein there is a single exact correct answer, and instead is a method that relies heavily on probability, which more closely approximates the human thought process.

Deep neural networks have achieved great performance in domains such as image detection, classification, localization, speech recognition and generation, text recognition, and motor control, by way of nonlimiting example.

There are disclosed herein two particular settings into which inputs and weights may be organized or categorized: fully connected layers and convolutional layers. Both settings involve the basic operation of a sum of products as part of execution in each of the many layers. These operations may consume a large percentage of execution time and energy. They may be mapped to the sum of the products of two operands:

a. Input data, also known as input feature maps.
 b. Weight data, also known as weights or coefficients.

In the following FIGURES, and in particular in FIGS. 16 through 20, the input data is represented as X, while the weight data is represented as W.

Approximate matrix multiplication (AMM) is particularly suited to these types of tasks, along with many other types of tasks such as lower-ranked factorizations, wherein a large matrix may be represented as the product of two smaller ones. Notably, large matrix multiplication, such as may be applied to these problems, need not always be of the exact nature of those performed on relatively smaller matrices for problems of less complexity. Rather, for highly complex tasks like machine learning and neural networks, approximate multiplications may be programmatically sufficient to provide the level of confidence necessary to drive the algorithms.

Binary vector factorization (BVF) is a highly optimized method of performing AMM. BVF decomposes a generic matrix into a binary matrix and a small dictionary vector to enable the calculation of matrix products via simple binary masks and iterative sums. Experimentally, BVF has been found to produce state-of-the-art results with highly compressed representations when applied to neural network implementations.

BVF is a multistage process in which results from one phase feed to another phase. In particular, a phase called $B^T x$ may employ a hardware accelerator including a grid in a two-dimensional array of multiplier accumulator (MAC) units and flip-flops (FFs) to keep partial results. (See FIG. 16 for further discussion regarding hardware acceleration, with respect to BVF, MACs, and FFs.)

Certain existing two-dimensional arrays of MACs and FFs take up a large amount of physical area on an integrated circuit, and consume a great deal of energy, as they keep partial results for each element in the grid. However, both the space consumption and power consumption of this array may be reduced by employing the half adder teachings of the present specification. (See FIG. 17 below.) For example, the teachings herein provide on the order of n FFs, compared to $n^2$ FFs in previous solutions. This reduction in the number of flip-flops naturally reduces the consumed surface area, and the consumed power, of the circuit.

BVF can be applied to a generic matrix structure and provides efficient binary factorization. In an embodiment, BVF comprises remapping the multiplications of the inner product between two vectors onto a series of sums among the input elements. In an embodiment:
  a. Each weight is encoded as a binary string of given bit length (for example, between 2 and 4) multiplying a fixed dictionary vector s. The bandwidth (BW) and the precision requirements set the allowed weight bit length. Test applications have shown 16× compression with resulting degradation below 1% when compared to single precision.
  b. BVF grants a computational advantage by removing large and power hungry vector multiplications (which require an equal number of multiplications and additions) into parallel binary masks and additions. In certain embodiments, this provides compute reduction up to 13×.
  c. The binary mapping of BVF allows the multiplicand to be stored with a much lower precision. This results in up to 8× compression (compared to single precision data type) without appreciable result degradation on typical problems of linear classification (i.e. linear mapping with a saturating non-linearity at the output).

BVF factorizes vectors (say vector w of length N) through a double minimization procedure. The compute reduction can be easily characterized by a typical inner vector product operation as follows:

$$w^T \cdot x \cong (B \cdot s)^T \cdot x = s^T \cdot (B^T \cdot x) = s^T \cdot z,$$

where $w \cong B \cdot s$ is the result of the factorization obtained by BVF ($B \in \{0,1\}^{N \times n}$, $s \in \mathbb{R}^n$), where n is n<<N, typical sizes of n are in the range of 2 to 8, and the size of N may be on the order of about $10^5$).

The formula above outlines how a vector multiplication can be addressed as the sequence of operations:
  a. n binary masks on the vector x and N/2 additions on average per mask (i.e. the term $B^T \cdot x$))
  b. n products and additions (i.e. the term $s^T \cdot z$).

The method may be applied to matrices by simply vectorizing them beforehand.

By way of concrete illustrative example, factorize a vector of elements w=[0, 3, −1, 8, 5, −3, 1] with a vector s=[−4, 8]. In this case, there are $2^{n=2}=4$ combinations [0, 8, −4, 4]. These numbers may be referred to as cluster centroids. BVF takes each number in w and associates it to its closest centroid to obtain an approximation for w, namely w*=[0, 4, 0, 8, 4, −4, 0]. Iterating this procedure to minimizing the error |w−w*| will converge to the most suited vector s (which may be referred to as an optimized dictionary vector s) and the most suited combination of the terms in s to closely approximate each element in w. Depending on the requirements or limitations of the problem at hand, some combinations might not be available (e.g., when only a few options at a time are available, further limitations of the hardware, damaged hardware, by way of nonlimiting example). BVF by its definition searches only "allowed" combinations.

The minimization procedure works iteratively given some initial conditions for vector s as follows:
  a. searching in an ordered vector (0~log(N)) for the best matching binary combination that solves for the corresponding element in the w vector.
  b. solving a quadratic minimization problem for vector s with an approximate pseudoinverse (0~N).

These two procedures are iterated until convergence. In many embodiments, the factorization converges in 10-20 iterations regardless of N or the underlying distribution of w.

The algorithm finds how to best represent each element of a weight vector (vector w) as any sum of combinations of a very few elements (also called the "dictionary" vector s). BVF convergence is based on a double minimization procedure to find the optimal dictionary (vector s) and the best way to combine its elements (matrix B). More precisely, BVF finds the optimal binary factorization $w \cong B \cdot s$ of an n-dimensional vector w onto a N×n-dimensional binary matrix B and a small n-dimensional vector s, wherein n<<N, where n may be in the range of 2-8, while N may be on the order of $10^5$. The method may be applied to matrices by simply vectorizing them beforehand.

Consider a generic example, $y = w^T x$, being the elementary compute algebraic primitive in a matrix to matrix multiplication (extracting one row from W and one column from X). Once factorization is obtained:
  a. Compress w into a binary matrix N×n-dimensional, or alternatively reduce the precision of w into an n-precision data format (plus a small vector s of the same precision of w, which may be neglected). This is similar to recoding each element of w as a partial sum of elements taken from a dictionary of length n.

b. Now substitute for w its factorization bases B·s, that is $y=w^T x \cong (B \cdot s)^T x = s^T B^T x = s^T (B^T x)$. By applying the algebraic rules of matrix transposition, the operation of multiplication of large vectors is absorbed by the binary masking on x via B, requiring on average n times N/2 additions (assuming a roughly equal number of 0s and 1s in the encoding of B). Only n multiplications and additions by multiplying vector s.

Given the product, or alternatively, the linear mapping, $Y=WX$, with $X \in \mathbb{D}^{k_x \times p}$, $Y \in \mathbb{D}^{k_y \times p}$, $W \in \mathbb{D}^{k_y \times k_x}$, $\mathbb{R} \supseteq \mathbb{D}$ ($\mathbb{D}$ is some defined domain), find the binary factorizations of $W \cong B$ S that minimize the $\varepsilon_c = 1,2 = \|W - \tilde{B}S\|^c$ error. In particular $S \in \mathbb{D}^{nk_x \times k_x}$ is a block diagonal with a single vector s of length $n \ll k_x k_y$ over the block, and $\tilde{B} \in \{0,1\}^{k_y \times nk_x}$.

For ease of notation, the direct factorization of the full matrix W may be referred to by its vectorized form $w \in \mathbb{D}^N$, with $N=k_y k_x$. Using this notation, it is possible to:

a. address the factorization of the entire matrix W at once: let $W \cong B \cdot s$, $B \in \{0,1\}^{N \times n}$, having a single $s \in \mathbb{D}^n$ for the entire W; or b. factorize each matrix row $w_i$ individually: obtaining for the entire W a set of $\{B\}_i$ and $\{s\}_i$ where $N=k_x$.

This vector notation is useful when addressing the elementary operation of the inner vector product when computing any matrix to matrix product.

The optimization finds the closest value for each element in w so that the errors in $l_1$ and in $l_2$ are minimized. This is achieved through double alternating optimization of s and B such that their product minimizes the error defined above.

Assume the full matrix W is directly factorized.

Certain of the figures below detail example architectures and systems to implement embodiments of the above. In some embodiments, one or more hardware components and/or instructions described above are emulated as detailed below, or implemented as software modules.

In certain examples, instruction(s) may be embodied in a "generic vector friendly instruction format," which is detailed below. In other embodiments, another instruction format is used. The description below of the write mask registers, various data transformations (swizzle, broadcast, etc.), addressing, etc. is generally applicable to the description of the embodiments of the instruction(s) above. Additionally, example systems, architectures, and pipelines are detailed below. Embodiments of the instruction(s) above may be executed on those systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are fewer fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Example Instruction Formats

Embodiments of the instruction(s) described herein may be embodied in different formats. Additionally, example systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations through the vector friendly instruction format.

The shared adder of the present specification takes advantage of certain features of the BVF algorithm when solving the matrix product W·X. These features of BVFs enable the replacement of the 2D array of MACs with a shared adder tree that requires N outer nodes (i.e. N/2+N/4+N/8+ . . . summing up the levels on the tree) and removes the need for $N^2$ flip-flops at each node of the 2D structure. Furthermore, because the adder trees receive the same input vector and because the weights are binary, the first level of the adder tree may be shared across all adder trees. When the number of adder trees is large this corresponds to reducing by half the overall number of adders, because the first adder tree level scales to N/2.

FIGS. 1a-1b are block diagrams illustrating a generic vector friendly instruction format and instruction templates thereof according one or more examples of the present specification. FIG. 1a is a block diagram illustrating a generic vector friendly instruction format and class A instruction templates thereof according to embodiments of the specification; while FIG. 1b is a block diagram illustrating the generic vector friendly instruction format and class B instruction templates thereof according to embodiments of the specification. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the specification will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1a include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1b include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1a-1b.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or fewer sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the specification, this field is divided into a class field 168, an alpha field 152, and a beta field 154. The augmentation operation field 150 allows common groups of operations to be performed in a single instruction rather than two, three, or four instructions.

Scale field 160—its content allows for the scaling of the index field's content for memory address generation (e.g., for address generation that uses $2^{scale}*\text{index}+\text{base}$).

Displacement Field 162A—its content is used as part of memory address generation (e.g., for address generation that uses $2^{scale}*\text{index}+\text{base}+\text{displacement}$).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operand's total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in one embodiment, preserving the old value of each element of the destination where the corresponding mask bit has a 0. In contrast, zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logic, etc. While embodiments of the specification are described in which the write mask field's 170 content selects one of a number of write mask registers that contains the write mask to be used (and thus the write mask field's 170 content indirectly identifies the masking to be performed), alternative embodiments allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1a-1b, the contents of this field select between class A and class B instructions. In FIGS. 1a-1b, rounded corner squares are used to indicate a specific value is present in a field (e.g., class A 168A and class B 168B for the class field 168 respectively in FIGS. 1a-1b).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale field 162B are not present.

No-Memory Access Instruction Templates—Full Round Control Type Operation

In the no memory access full round control type operation 110 instruction template, the beta field 154 is interpreted as a round control field 154A, whose content provides static rounding. While in the described embodiments of the specification the round control field 154A includes a suppress all floating point exceptions (SAE) field 156 and a round operation control field 158, alternative embodiments may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., round-up, round-down, round-towards-zero and round-to-nearest). Thus, the round operation control field 158 allows for the changing of the rounding mode on a per-instruction basis. In one embodiment of the specification where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1a, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, while the elements that are actually transferred are dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the first-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale field 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., round-up, round-down, round-towards-zero and round-to-nearest). Thus, the round operation control field 159A allows for the changing of the rounding mode on a per instruction basis. In one embodiment of the specification where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted by the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the specification, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the specification). Also, a single processor may include multiple cores, all of which support the same class or in which different cores support different classes. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implemented in the other class in different embodiments of the specification. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Example Specific Vector Friendly Instruction Format

FIG. 2a is a block diagram illustrating an example specific vector friendly instruction format according to embodiments of the specification. FIG. 2a shows a specific vector friendly instruction format 200 that is specific in the sense that it specifies the location, size, interpretation, and order of the fields, as well as values for some of those fields. The specific vector friendly instruction format 200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIGS. 1a and 1b into which the fields from FIG. 2a map are illustrated.

It should be understood that, although embodiments of the specification are described with reference to the specific vector friendly instruction format 200 in the context of the generic vector friendly instruction format 100 for illustrative purposes, the present specification is not limited to the specific vector friendly instruction format 200 except where claimed. For example, the generic vector friendly instruction format 100 contemplates a variety of possible sizes for the various fields, while the specific vector friendly instruction format 200 is shown as having fields of specific sizes. By way of specific example, while the data element width field 164 is illustrated as a one bit field in the specific vector friendly instruction format 200, the present specification is not so limited (that is, the generic vector friendly instruction format 100 contemplates other sizes of the data element width field 164).

The generic vector friendly instruction format 100 includes the following fields listed below in the order illustrated in FIG. 2a.

EVEX Prefix (Bytes 0-3) 202—is encoded in a four-byte form.

Format Field 140 (EVEX Byte 0, bits [7:0])—the first byte (EVEX Byte 0) is the format field 140 and it contains 0x62 (the unique value used for distinguishing the vector friendly instruction format in one embodiment).

The second through fourth bytes (EVEX Bytes 1-3) include a number of bit fields providing specific capability.

REX field 205 (EVEX Byte 1, bits [7-5])—consists of a EVEX.R bit field (EVEX Byte 1, bit [7]—R), EVEX.X bit field (EVEX byte 1, bit [6]—X), and 157BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 110—this is the first part of the REX' field 110 and is the EVEX.R' bit field (EVEX Byte 1, bit [4]—R') that is used to encode either the upper 16 or lower 16 of the extended 32 register set. In one embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; other embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 215 (EVEX byte 1, bits [3:0]—mmmm)—its content encodes an implied leading opcode byte (0F, 0F 38, or 0F 3).

Data element width field 164 (EVEX byte 2, bit [7]—W)—is represented by the notation EVEX.W. EVEX.W is used to define the granularity (size) of the datatype (either 32-bit data elements or 64-bit data elements).

EVEX.vvvv 220 (EVEX Byte 2, bits [6:3]—vvvv)—the role of EVEX.vvvv may include the following: 1) EVEX.vvvv encodes the first source register operand, specified in inverted (1s complement) form and is valid for instructions with two or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 220 encodes the four low-order bits of the first source register specifier stored in inverted (1s complement) form. Depending on the instruction, an extra different EVEX bit field is used to extend the specifier size to 32 registers.

EVEX.U 168 Class field (EVEX byte 2, bit [2]—U)—If EVEX.U=0, it indicates class A or EVEX.U0; if EVEX.U=1, it indicates class B or EVEX.U1.

Prefix encoding field 225 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 152 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 154 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 110—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 170 (EVEX byte 3, bits [2:0]—kkk)—its content specifies the index of a register in the write mask registers as previously described. In one embodiment, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 230 (Byte 4) is also known as the opcode byte. Part of the opcode is specified in this field.

MOD R/M Field 240 (Byte 5) includes MOD field 242, Reg field 244, and R/M field 246. As previously described, the MOD field's 242 content distinguishes between memory access and non-memory access operations. The role of Reg field 244 can be summarized to two situations: encoding either the destination register operand or a source register operand, or be treated as an opcode extension and not used to encode any instruction operand. The role of R/M field 246 may include the following: encoding the instruction operand that references a memory address, or encoding either the destination register operand or a source register operand.

Scale, Index, Base (SIB) Byte (Byte 6)—As previously described, the scale field's 150 content is used for memory address generation. SIB.xxx 254 and SIB.bbb 256—the contents of these fields have been previously referred to with regard to the register indexes Xxxx and Bbbb.

Displacement field 162A (Bytes 7-10)—when MOD field 242 contains 10, bytes 7-10 are the displacement field 162A, and it works the same as the legacy 32-bit displacement (disp32) and works at byte granularity.

Displacement factor field 162B (Byte 7)—when MOD field 242 contains 01, byte 7 is the displacement factor field 162B. The location of this field is the same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 162B is a reinterpretation of disp8; when using displacement factor field 162B, the actual displacement is determined by the content of the displacement factor field multiplied by the size of the memory operand access (N). This type of displacement is referred to as disp8*N. This reduces the average instruction length (a single byte used for the displacement but with a much greater range). Such compressed displacement is based on the assumption that the effective displacement is a multiple of the granularity of the memory access, and hence, the redundant low-order bits of the address offset do not need to be encoded. In other words, the displacement factor field 162B substitutes the legacy x86 instruction set 8-bit displacement. Thus, the displacement factor field 162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 172 operates as previously described.

Full Opcode Field

Figure 2B:
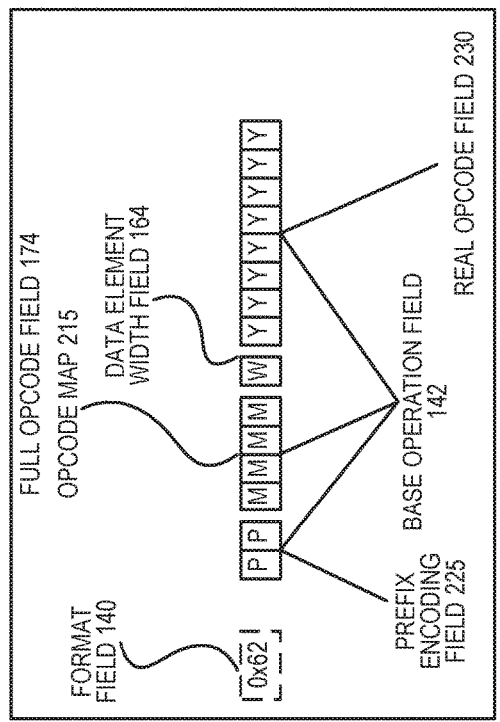

FIG. 2b is a block diagram illustrating the fields of the specific vector friendly instruction format 200 that make up the full opcode field 174 according to one or more examples of the present specification. Specifically, the full opcode field 174 includes the format field 140, the base operation field 142, and the data element width (W) field 164. The base operation field 142 includes the prefix encoding field 225, the opcode map field 215, and the real opcode field 230.

Register Index Field

Figure 2C:
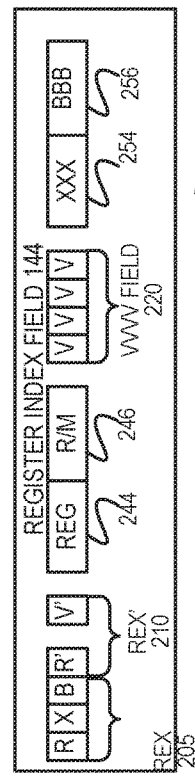

FIG. 2c is a block diagram illustrating the fields of the specific vector friendly instruction format 200 that make up the register index field 144 according to one embodiment. Specifically, the register index field 144 includes the REX field 205, the REX' field 210, the MODR/M.reg field 244, the MODR/M.r/m field 246, the VVVV field 220, xxx field 254, and the bbb field 256.

Augmentation Operation Field

Figure 2D:
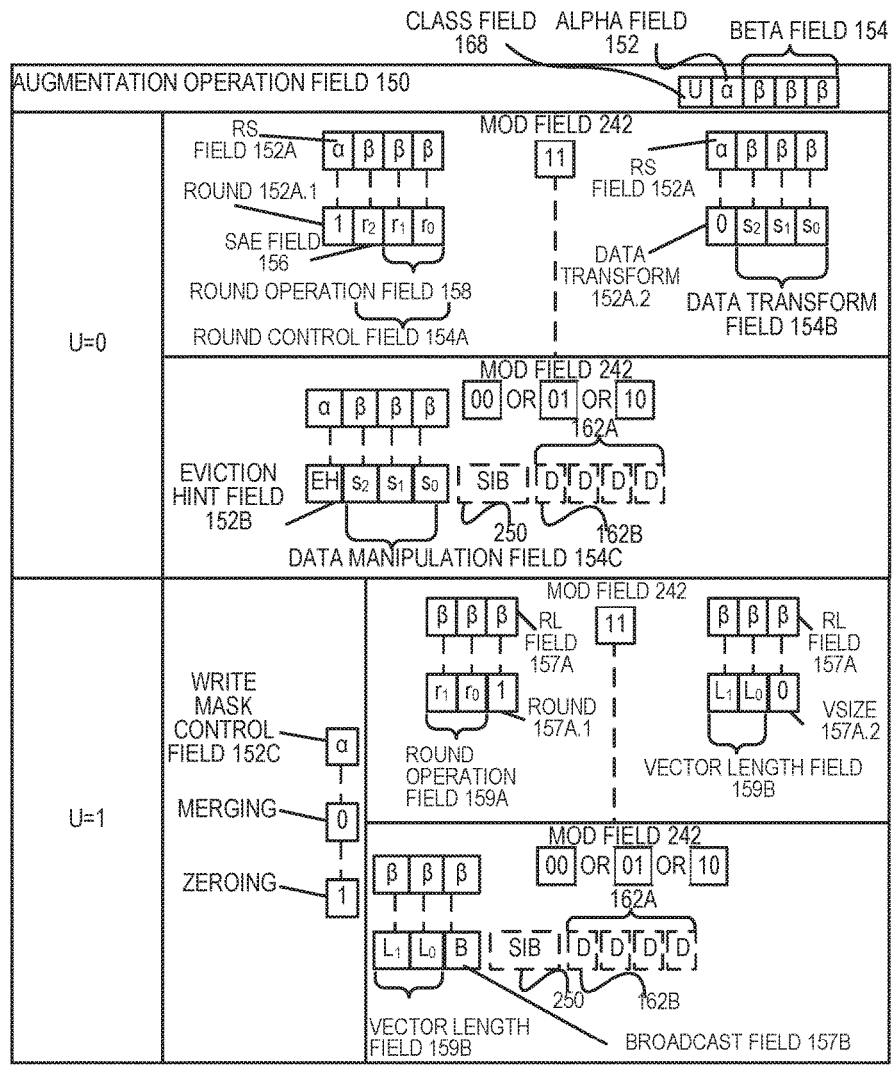

FIG. 2d is a block diagram illustrating the fields of the specific vector friendly instruction format 200 that make up the augmentation operation field 150 according to one embodiment. When the class (U) field 168 contains 0, it signifies EVEX.U0 (class A 168A); when it contains 1, it signifies EVEX.U1 (class B 168B). When U=0 and the MOD field 242 contains 11 (signifying a no memory access operation), the alpha field 152 (EVEX byte 3, bit [7]—EH) is interpreted as the rs field 152A. When the rs field 152A contains a 1 (round 152A.1), the beta field 154 (EVEX byte 3, bits [6:4]—SSS) is interpreted as the round control field 154A. The round control field 154A includes a one bit SAE field 156 and a two bit round operation field 158. When the rs field 152A contains a 0 (data transform 152A.2), the beta field 154 (EVEX byte 3, bits [6:4]—SSS) is interpreted as a three bit data transform field 154B. When U=0 and the MOD field 242 contains 00, 01, or 10 (signifying a memory access operation), the alpha field 152 (EVEX byte 3, bit [7]—EH) is interpreted as the eviction hint (EH) field 152B and the beta field 154 (EVEX byte 3, bits [6:4]—SSS) is interpreted as a three bit data manipulation field 154C.

When U=1, the alpha field 152 (EVEX byte 3, bit [7]—EH) is interpreted as the write mask control (Z) field 152C. When U=1 and the MOD field 242 contains 11 (signifying a no memory access operation), part of the beta field 154 (EVEX byte 3, bit [4]—$S_0$) is interpreted as the RL field 157A; when it contains a 1 (round 157A.1) the rest of the beta field 154 (EVEX byte 3, bit [6-5]—$S_{2-1}$) is interpreted as the round operation field 159A, while when the RL field 157A contains a 0 (VSIZE 157.A2) the rest of the beta field 154 (EVEX byte 3, bit [6-5]—$S_{2-1}$) is interpreted as the vector length field 159B (EVEX byte 3, bit [6-5]—$L_{1-0}$). When U=1 and the MOD field 242 contains 00, 01, or 10 (signifying a memory access operation), the beta field 154 (EVEX byte 3, bits [6:4]—SSS) is interpreted as the vector length field 159B (EVEX byte 3, bit [6-5]—$L_{1-0}$) and the broadcast field 157B (EVEX byte 3, bit [4]—B).

Example Register Architecture

Figure 3:
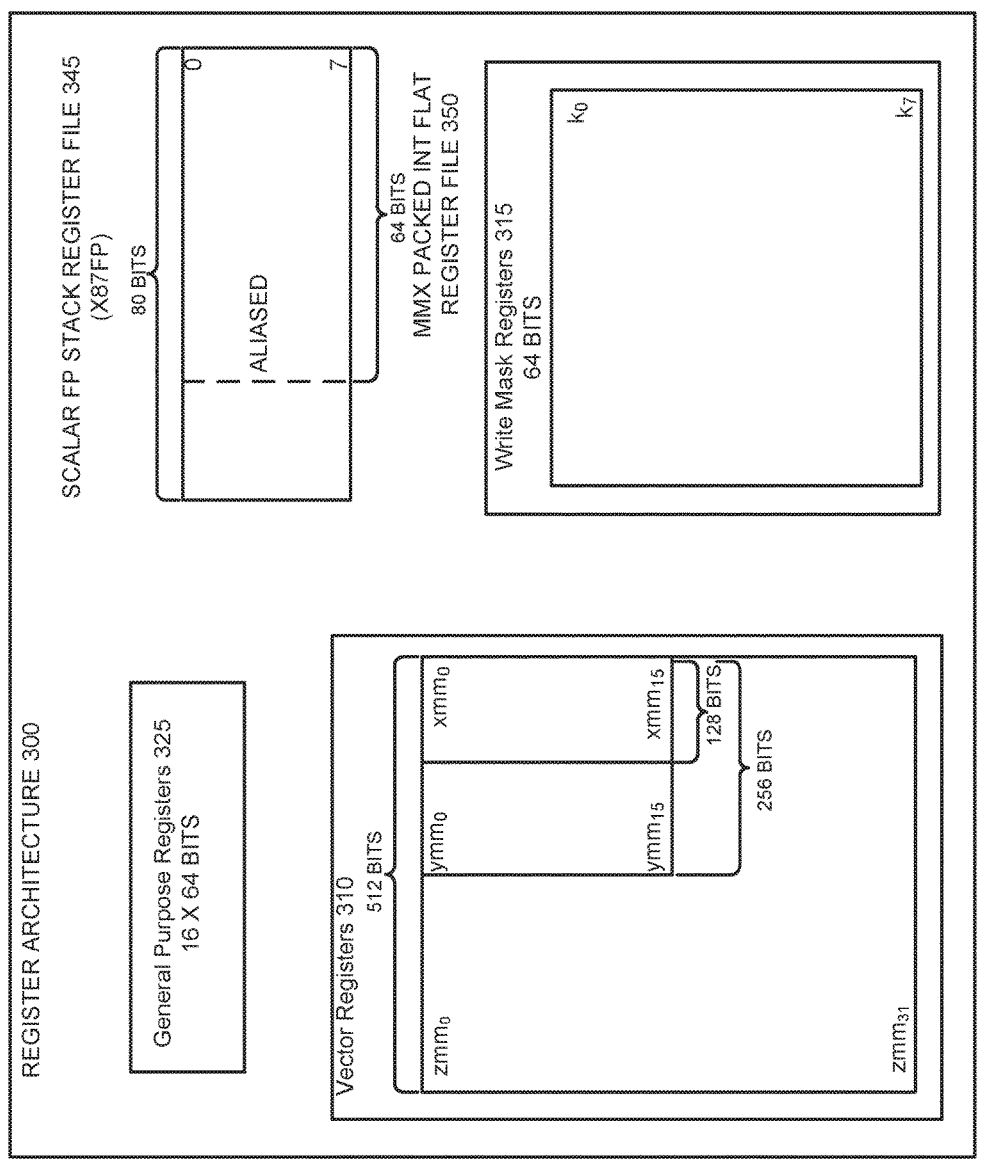
FIG. 3 is a block diagram of a register architecture according to one or more examples of the present specification.

FIG. 3 is a block diagram of a register architecture 300 according to one or more examples of the present specification. In the embodiment illustrated, there are 32 vector registers 310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 200 operates on these overlaid register file as illustrated in the below tables.

| Adjustable Vector Length | Class | Operations | Registers |
|---|---|---|---|
| Instruction Templates that do not include the vector length field 159B | A (FIG. 1A; U = 0) | 110, 115, 125, 130 | zmm registers (the vector length is 64 byte) |
| | B (FIG. 1B; U = 1) | 112 | zmm registers (the vector length is 64 byte) |
| Instruction templates that do include the vector length field 159B | B (FIG. 1B; U = 1) | 117, 127 | zmm, ymm, or xmm registers (the vector length is 64 byte, 32 byte, or 16 byte) depending on the vector length field 159B |

In other words, the vector length field 159B selects between a maximum length and one or more other shorter lengths, where each such shorter length is half the length of the preceding length; and instructions templates without the vector length field 159B operate on the maximum vector length. Further, in one embodiment, the class B instruction templates of the specific vector friendly instruction format 200 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 315—in the embodiment illustrated, there are 8 write mask registers (k0 through k7), each 64 bits in size. In an alternate embodiment, the write mask registers 315 are 16 bits in size. As previously described, in one embodiment, the vector mask register k0 cannot be used as a write mask; when the encoding that would normally indicate k0 is used for a write mask, it selects a hardwired write mask of 0xFFFF, effectively disabling write masking for that instruction.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Other embodiments may use wider or narrower registers. Additionally, other embodiments may use more, less, or different register files and registers.

Example Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Example core architectures are described next, followed by descriptions of example processors and computer architectures.

Example Core Architectures
In-Order and Out-of-Order Core Block Diagram FIG. 4a is a block diagram illustrating both an example in-order pipeline and an example register-renaming, out-of-order issue/execution pipeline according to one or more examples of the present specification. FIG. 4b is a block diagram illustrating both an example embodiment of an in-order architecture core and an example register-renaming, out-of-order issue/execution architecture core to be included in a processor according to one or more examples of the present specification. The solid lined boxes in FIGS. 4a-4b illustrate the in-order pipeline and in-order core, while the optional addition of the dashed lined boxes illustrates the register-renaming, out-of-order issue/execution pipeline and core. Given that the in-order aspect is a subset of the out-of-order aspect, the out-of-order aspect will be described.

In FIG. 4a, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4b shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the register-renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Example In-Order Core Architecture

FIGS. 5a-5b illustrate a block diagram of a more specific example in-order core architecture, in which the core is one of several logic blocks (including other cores of the same type and/or different types) in a chip according to one or more examples of the present specification. The logic blocks communicate through a high-bandwidth interconnect network (e.g., a ring network) with some fixed function logic, memory I/O interfaces, and other necessary I/O logic, depending on the application.

FIG. 5a is a block diagram of a single processor core, along with its connection to the on-die interconnect network 502 and with its local subset of the Level 2 (L2) cache 504, according to one or more embodiments. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, other embodiments may use a different approach (e.g., use a single register set or include a communication path that allows data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data path is 1012 bits wide per direction.

FIG. 5b is an expanded view of part of the processor core in FIG. 5a according to embodiments of the specification. FIG. 5b includes an L1 data cache 506A part of the L1 cache 504, as well as more detail regarding the vector unit 510 and the vector registers 514. Specifically, the vector unit 510 is a 16-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input. Write mask registers 526 allow predicating resulting vector writes.

Figure 6:
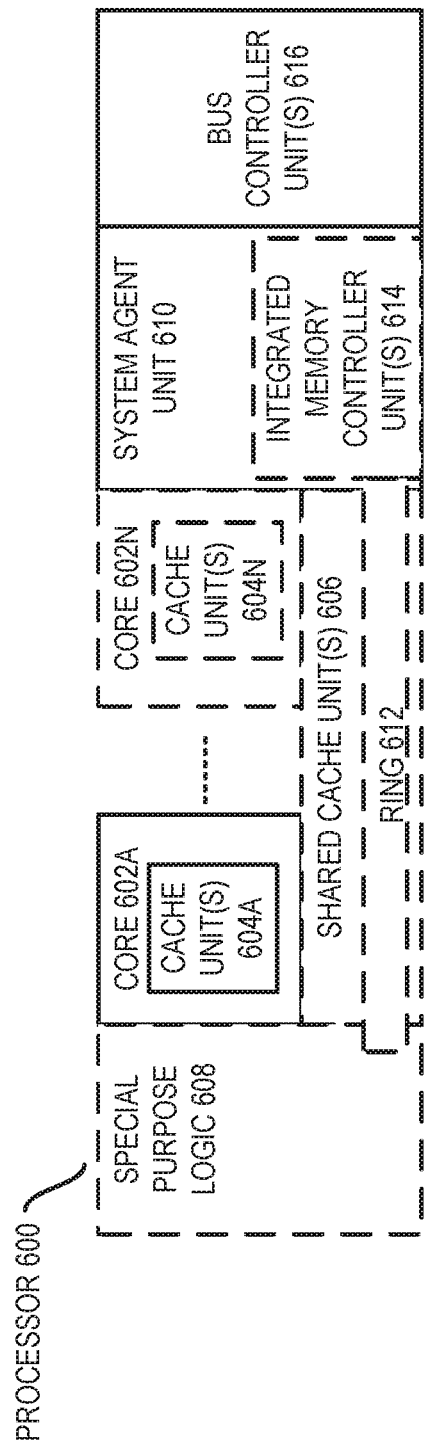
FIG. 6 is a block diagram of a processor that may have more than one core, may have an integrated memory controller, and may have integrated graphics according to one or more examples of the present specification.

FIG. 6 is a block diagram of a processor 600 that may have more than one core, may have an integrated memory controller, and may have integrated graphics according to according to one or more examples of the present specification. The solid lined boxes in FIG. 6 illustrate a processor 600 with a single core 602A, a system agent 610, and a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput) logic; and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Example Computer Architectures

FIGS. 7-10 are block diagrams of example computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
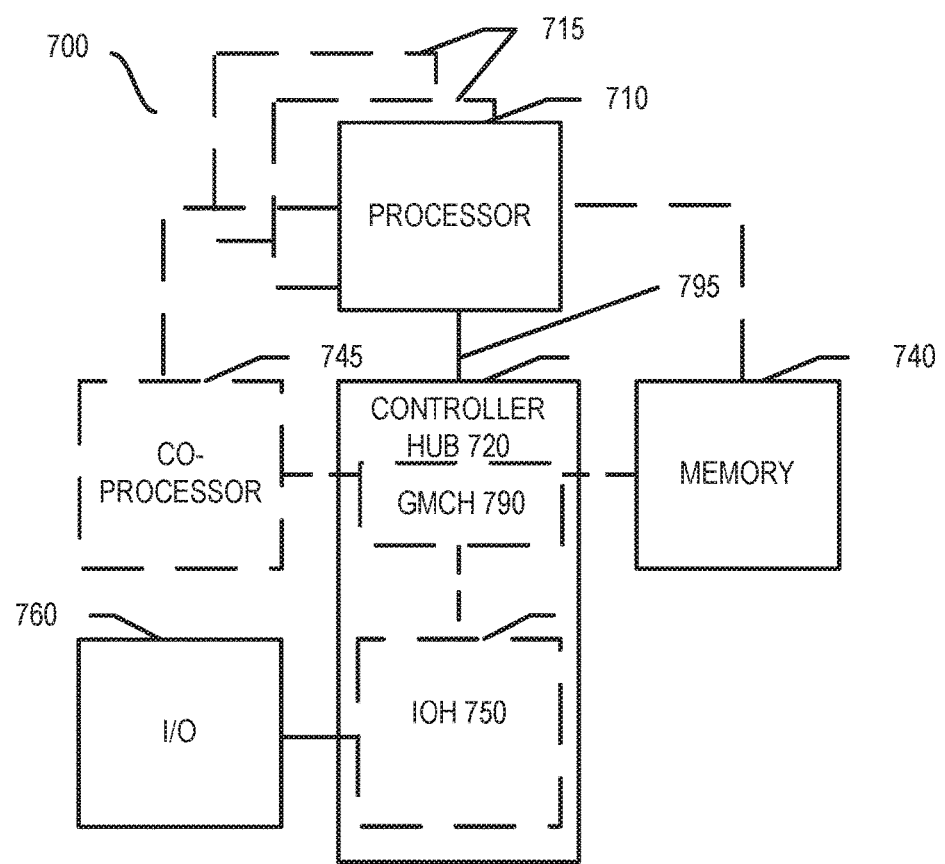
FIGS. 7-10 are block diagrams of computer architectures according to one or more examples of the present specification.

Referring now to FIG. 7, shown is a block diagram of a system 700 according to one or more examples of the present specification. The system 700 may include one or more processors 710, 715, which are coupled to a controller hub 720. In one embodiment the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface such as Ultra Path Interconnect™ (UPI), or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 715 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
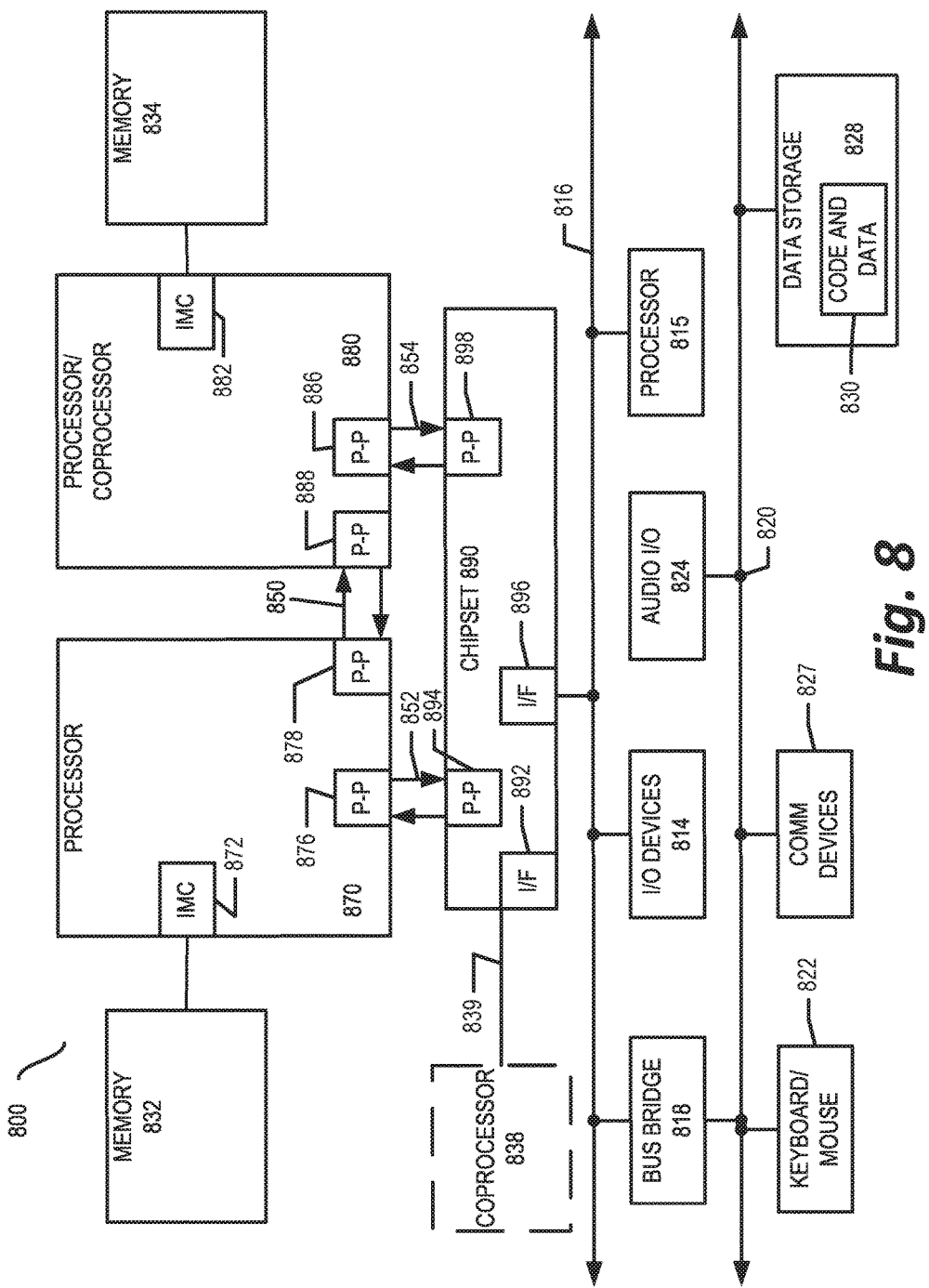

Referring now to FIG. 8, shown is a block diagram of a first more specific example system 800 according to one or more examples of the present specification. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870 and 880 may each exchange information with a chipset 890 via individual P-P interfaces 852, 854 using point to point interface circuits 876, 894, 886, 898. Chipset 890 may optionally exchange information with the coprocessor 838 via a high-performance interface 839. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, by way of nonlimiting example.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 820.

Note that other architectures are possible. For example, instead of the point-to-point architecture of FIG. 8, a system may implement a multi-drop bus or other such architecture.

Figure 9:
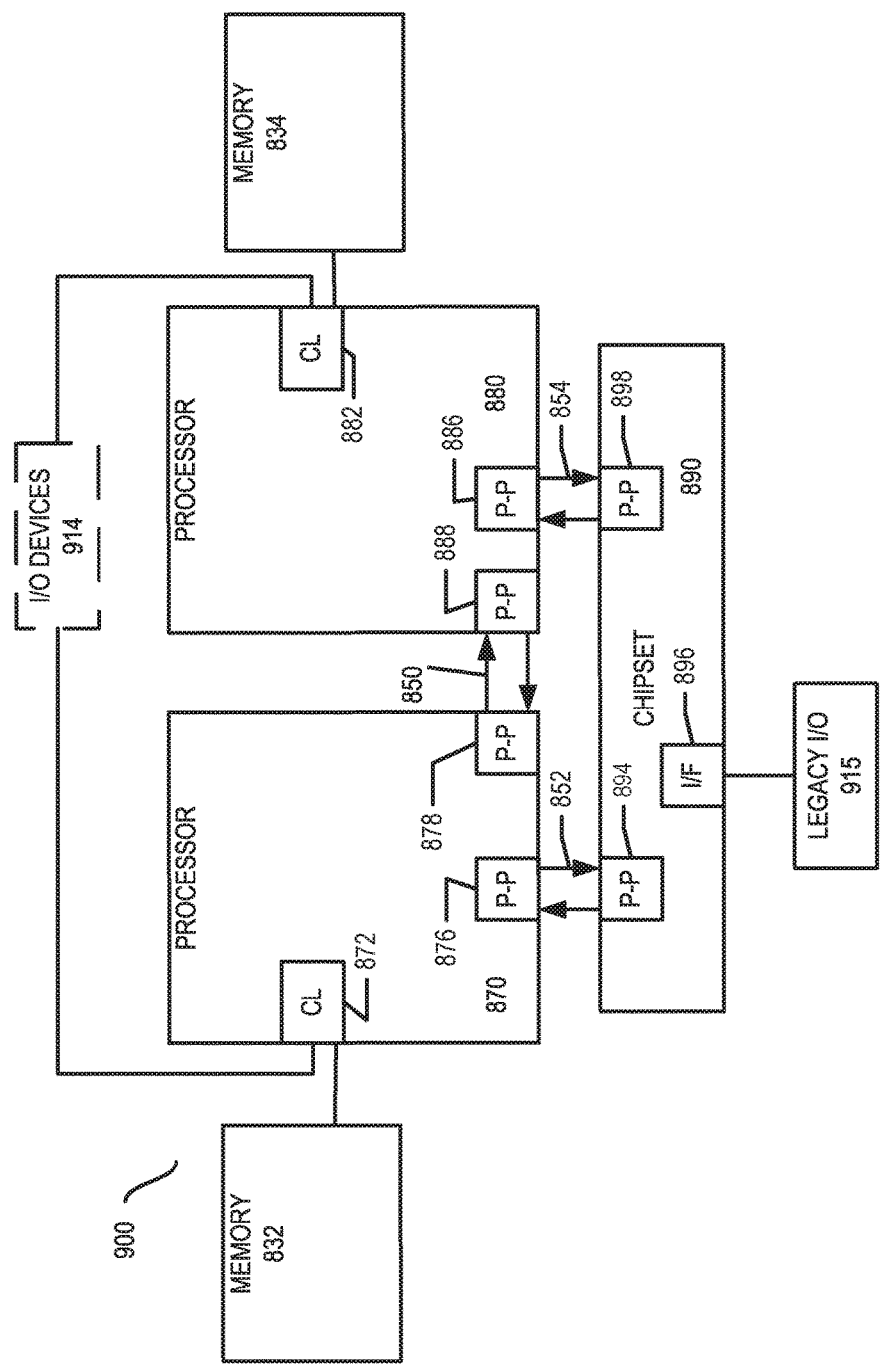

Referring now to FIG. 9, shown is a block diagram of a second more specific example system 900 according to one or more examples of the present specification. FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 872 and 882, respectively. Thus, the CL 872, 882 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
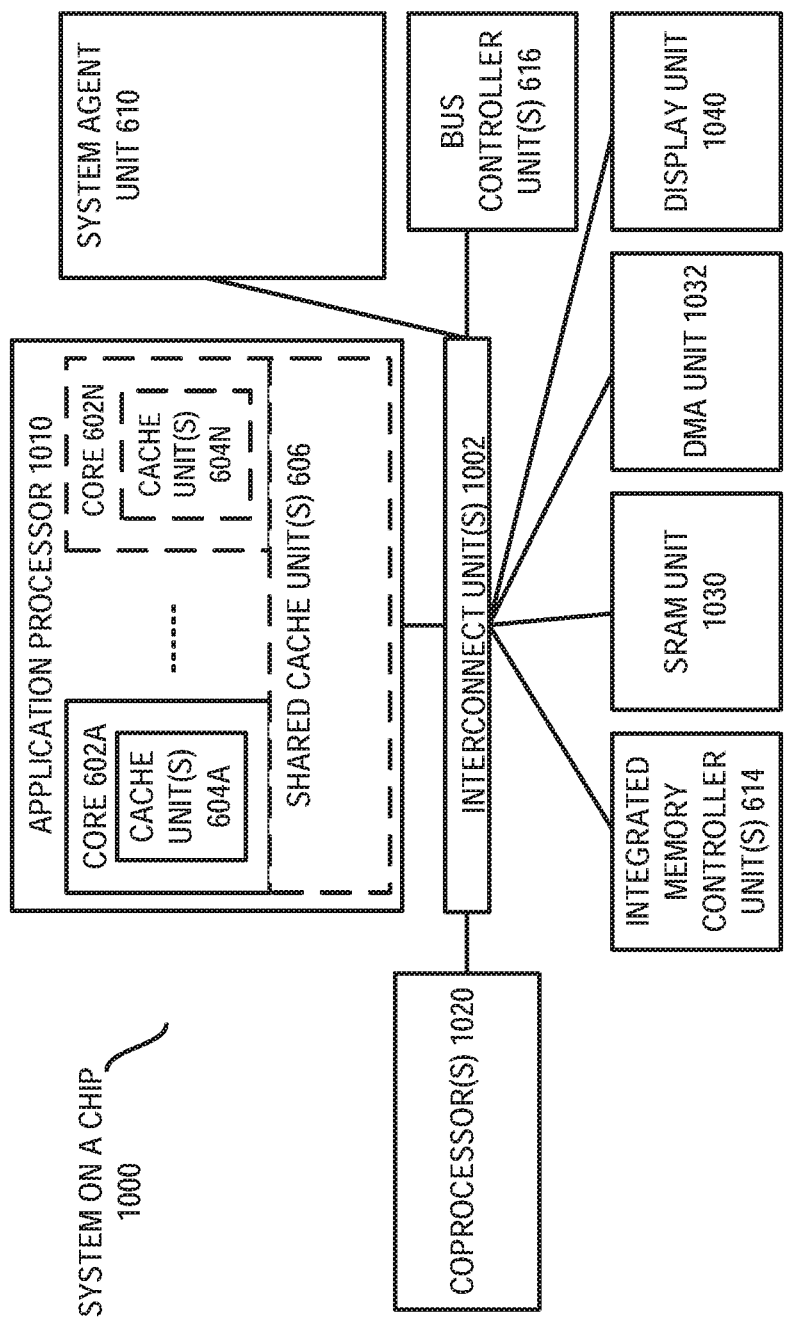

Referring now to FIG. 10, shown is a block diagram of a SoC 1000 according to one or more examples of the present specification. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 202A-N and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Some embodiments may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, some embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
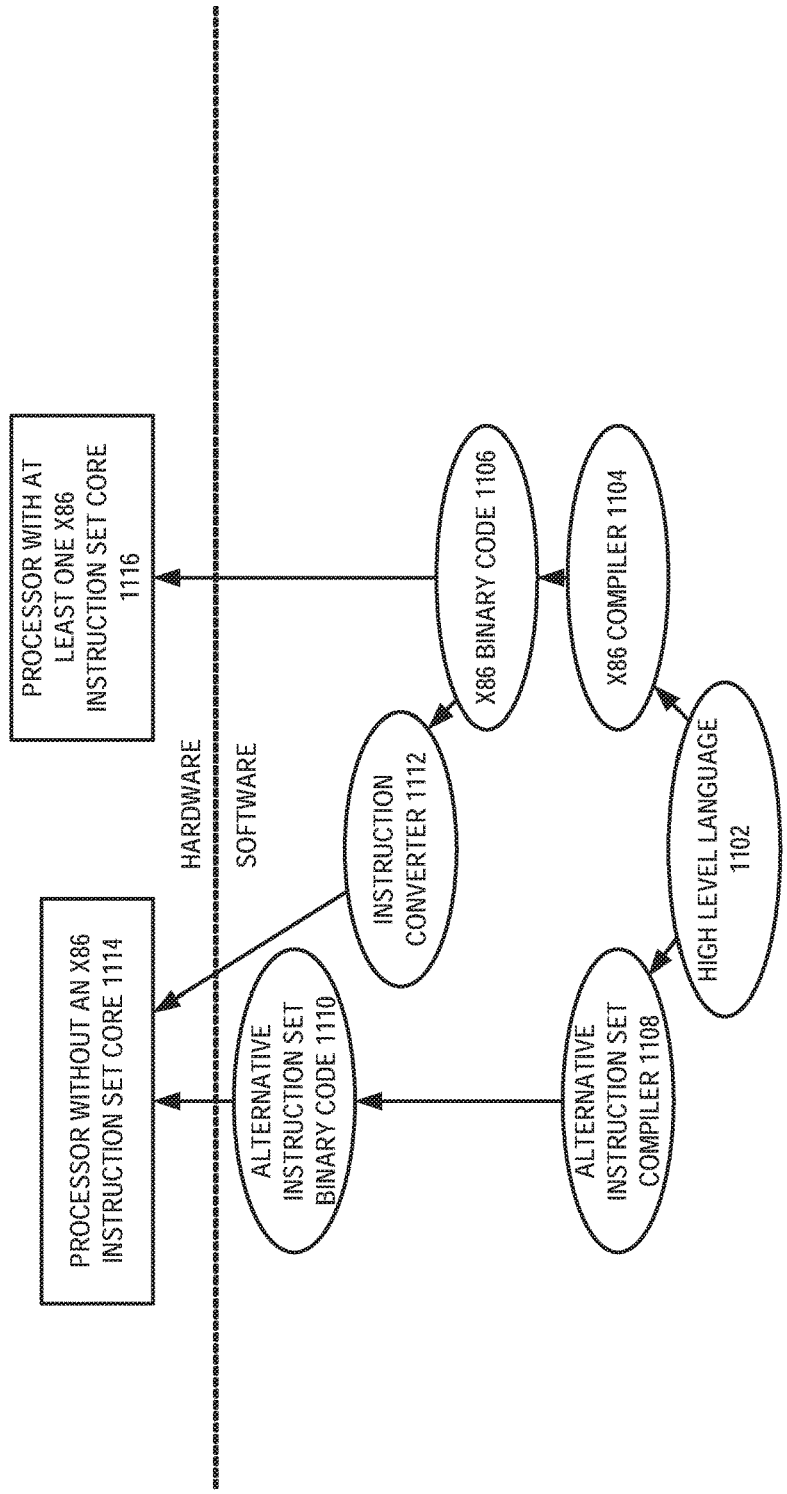
FIG. 11 is a block diagram contrasting the use of a software instruction converter to convert binary instructions in a source instruction set to binary instructions in a target instruction set according to one or more examples of the present specification.

FIG. 11 is a block diagram contrasting the use of a software instruction converter to convert binary instructions in a source instruction set to binary instructions in a target instruction set according to one or more examples of the present specification. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an x86 compiler 1104 to generate x86 binary code 1106 that may be natively executed by a processor with at least one x86 instruction set core 1116. The processor with at least one x86 instruction set core 1116 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1104 represents a compiler that is operable to generate x86 binary code 1106 (e.g., object code) that can, with or without additional linkage processing, be executed on the processor with at least one x86 instruction set core 1116. Similarly, FIG. 11 shows the program in the high level language 1102 may be compiled using an alternative instruction set compiler 1108 to generate alternative instruction set binary code 1110 that may be natively executed by a processor without at least one x86 instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the x86 binary code 1106 into code that may be natively executed by the processor without an x86 instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have an x86 instruction set processor or core to execute the x86 binary code 1106.

Figure 12:
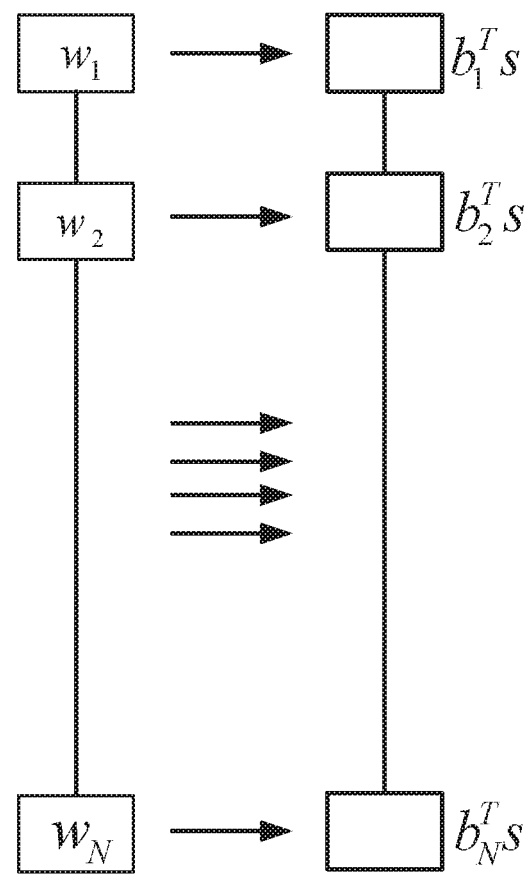
FIG. 12 illustrates a schema of BVF according to one or more examples of the present specification.

FIG. 12 is an illustration of a factorization schema according to one or more examples of the present specification. Each weight is factorized into the product of a binary string $b_i$ (i.e. a line of the B matrix), and the small coefficient vector s, which is equal for every factorized weight.

Figure 13:
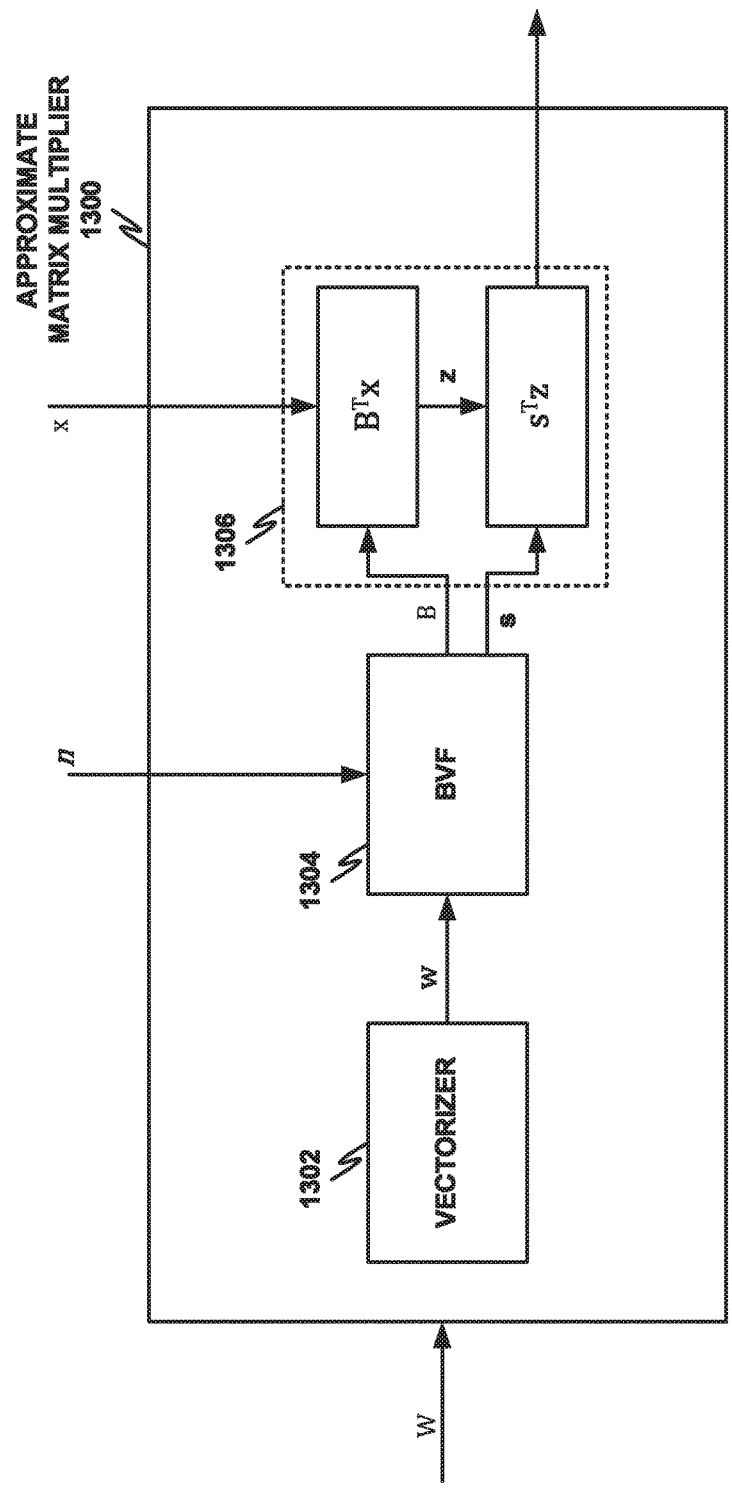
FIG. 13 is a system model of an approximate matrix multiplier using BVF according to one or more examples of the present specification.

FIG. 13 is a system diagram of approximate matrix multiplication unit 1300 according to one or more examples of the present specification. Note that in various embodiments, AMM 1300 may be an integrated part of a microprocessor, a standalone AMM circuit, a coprocessor, or an intellectual property (IP) block that can be integrated into a processor or integrated circuit. In this example, approximate matrix multiplier 1300 receives as an input matrix W. As necessary, vectorizer 1302 vectorizes W into vector w. FIG. 13 illustrates a logical or mathematical flow of operations for BVF, while other FIGURES herein may illustrate other aspects, such as in block relationships.

Taking w as an input, vectorizer 1302 vectorizes the input W. BVF (Binary Vector factorization) block 1304 performs BVF on the vector as described above. This includes taking an input n<<N, that is the compression parameter described above. The outputs of BVF are B and s.

Finally, a multiplier 1306 computes the quantities: $z=B^T x$ to provide the output $s^T z$. This output illustrates a concrete application of BVF, providing an approximated multiplication of $w^T x$.

Figure 14:
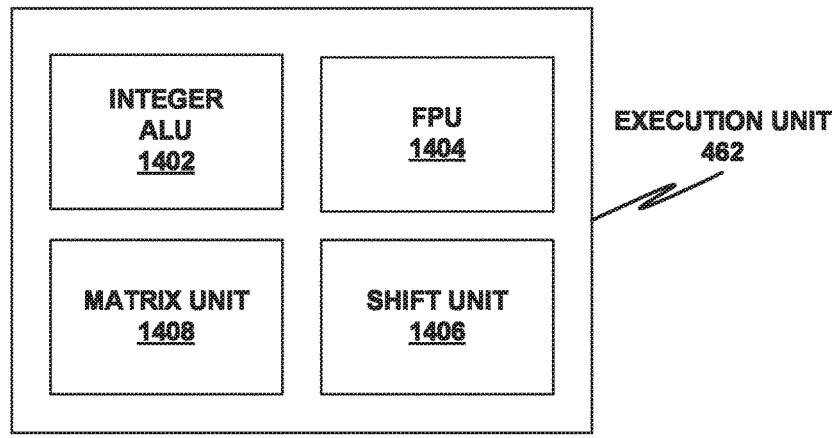
FIG. 14 is a block diagram of an execution unit according to one or more examples of the present specification.

FIG. 14 is a block diagram of selected elements of an execution unit 462 according to one or more examples of the present specification. In this example, execution unit 462 includes an integer arithmetic logic unit (ALU) 1402. ALU 1402 may be a combinational circuit that performs arithmetic and bitwise operations on binary integers. Execution unit 462 also includes a floating point unit (FPU) 1404, which may be a coprocessor, or which may be integrated into the CPU. A shift unit 1406 may provide right and left shift operations, which may correspond to integer multiplication and division, among other uses.

Execution unit 462 includes a matrix unit 1408, which may be an approximate matrix multiplier (AMM), meaning that it may not perform a full, formal matrix multiplication. Rather, matrix unit 1408 may perform an approximate multiplication on a lower-resolution matrix, such as with AMM 1300 of FIG. 13, or with a BVF-like AMM unit.

Execution unit 462 may also include other elements not shown, and may provide many different functions. The elements disclosed here are for purposes of illustration, and to disclose a context in which a matrix unit 1408 may appear.

Figure 15:
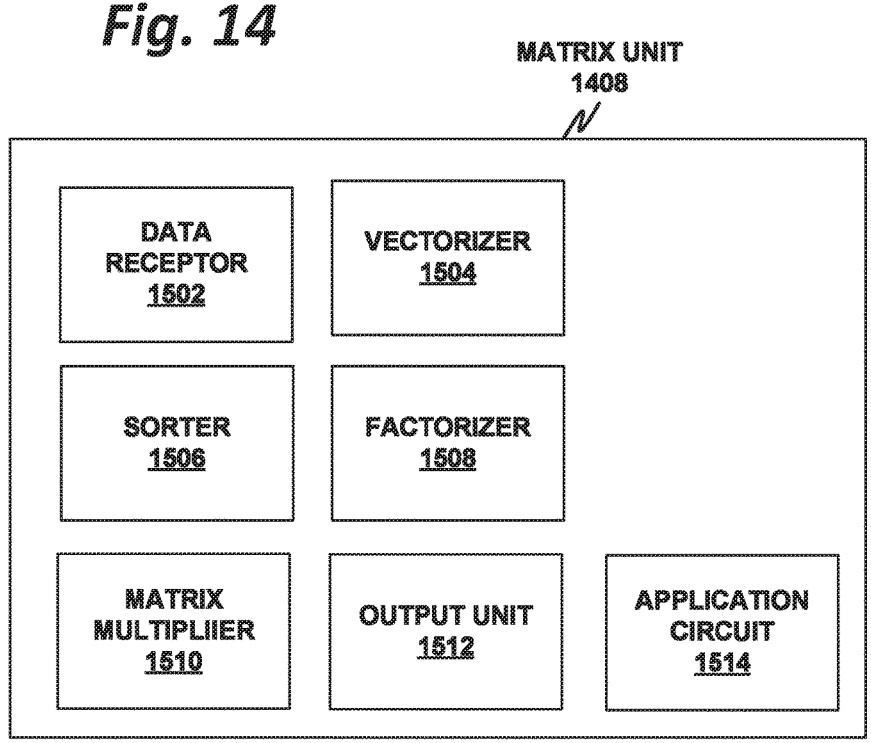
FIG. 15 is a block diagram of a matrix unit according to one or more examples of the present specification.

FIG. 15 is a block diagram of selected elements of a matrix unit 1408. Note that matrix unit 1408 discloses certain elements that may be used in conjunction with, in addition to, or as part of matrix unit 1408. In particular, the block diagram of FIG. 15 may include the use of hardware acceleration to compute $B^T x$.

In this example, matrix unit 1408 includes a data receptor 1502. This may be an input circuit, which allows matrix unit 1408 to receive an input matrix W. This may include a data bus, such as a 16-, 32-, or 64-bit data bus, a serial data bus, or any other suitable circuit for transferring data.

Vectorizer 1504 may, as necessary, vectorize input matrix W to yield one or more weight vectors w.

Sorter 1506 may perform the sorting operations disclosed herein, such as sorting vector w into $w_0$, or sorting p as necessary.

Figure 21:
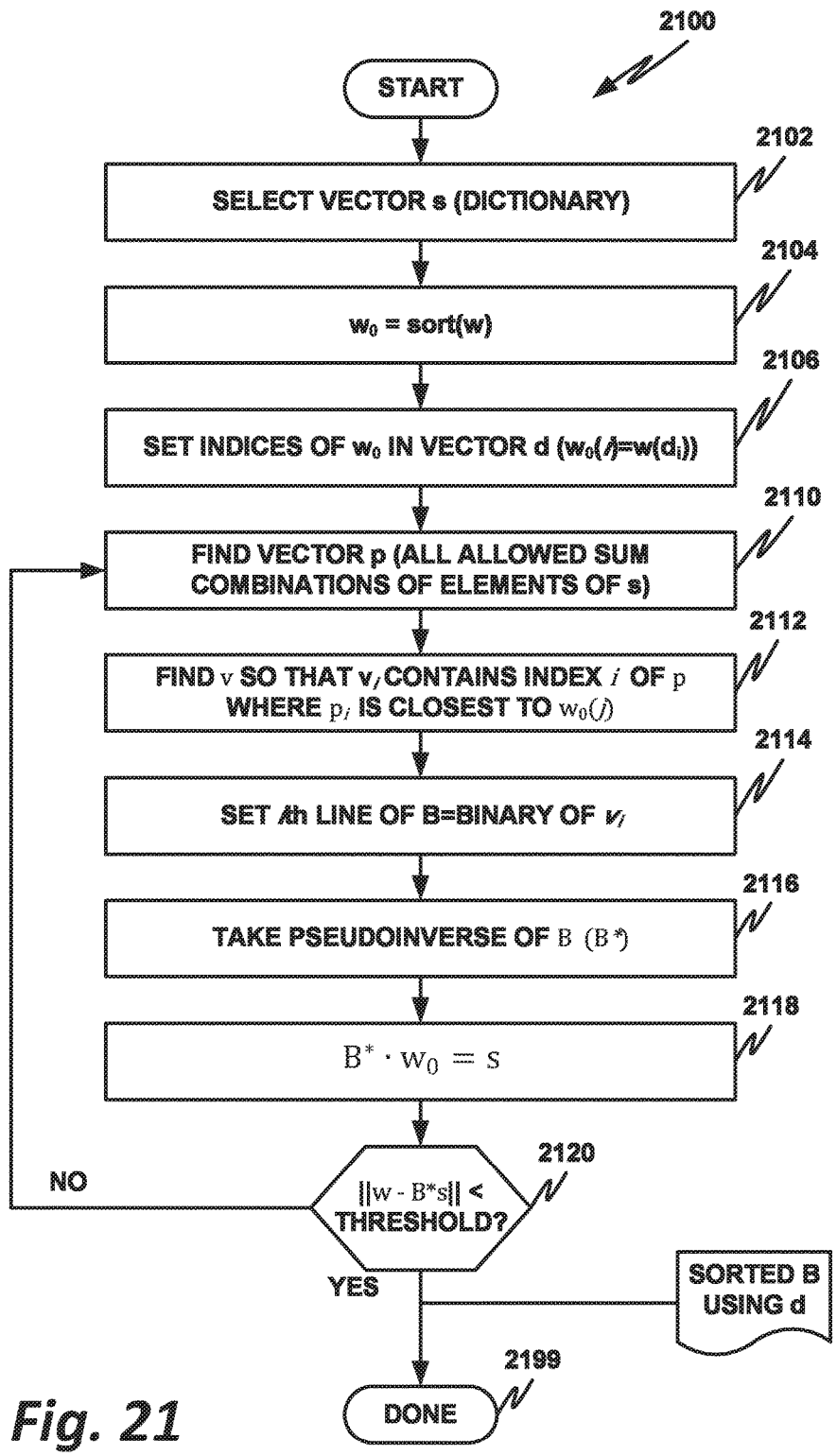
FIG. 21 is a flowchart of an overall BVF method according to one or more examples of the present specification.

Factorizer 1508 is a circuit to provide the factorization methods disclosed herein, such as method 2100 of FIG. 21, and any other necessary factorization.

Matrix multiplier 1510 performs the matrix multiplications disclosed herein, and provides the final AMM output.

Output unit 1512 is a circuit to provide the output of matrix unit 1408 to other parts of the system or processor. As with data receptor 1502, output unit 1512 may be any suitable bus or communication circuit.

An application circuit 1514 may be provided as part of, or in addition to, matrix unit 1408. In this illustration, application circuit 1514 is shown as residing logically within matrix unit 1408, but this example is nonlimiting. Application circuit may be any circuit, or other combination of logic elements, including without limitation hardware, software, and/or firmware, that applies the AMM of matrix unit 1408 to a problem, such as a computer intelligence problem. Example computer intelligence problems that may be solved by application circuit 1514 include, by way of nonlimiting example, neural networks, object recognition, image processing, video processing, driver assistance systems, self-driving automobile controllers, and facial recognition.

Figure 16:
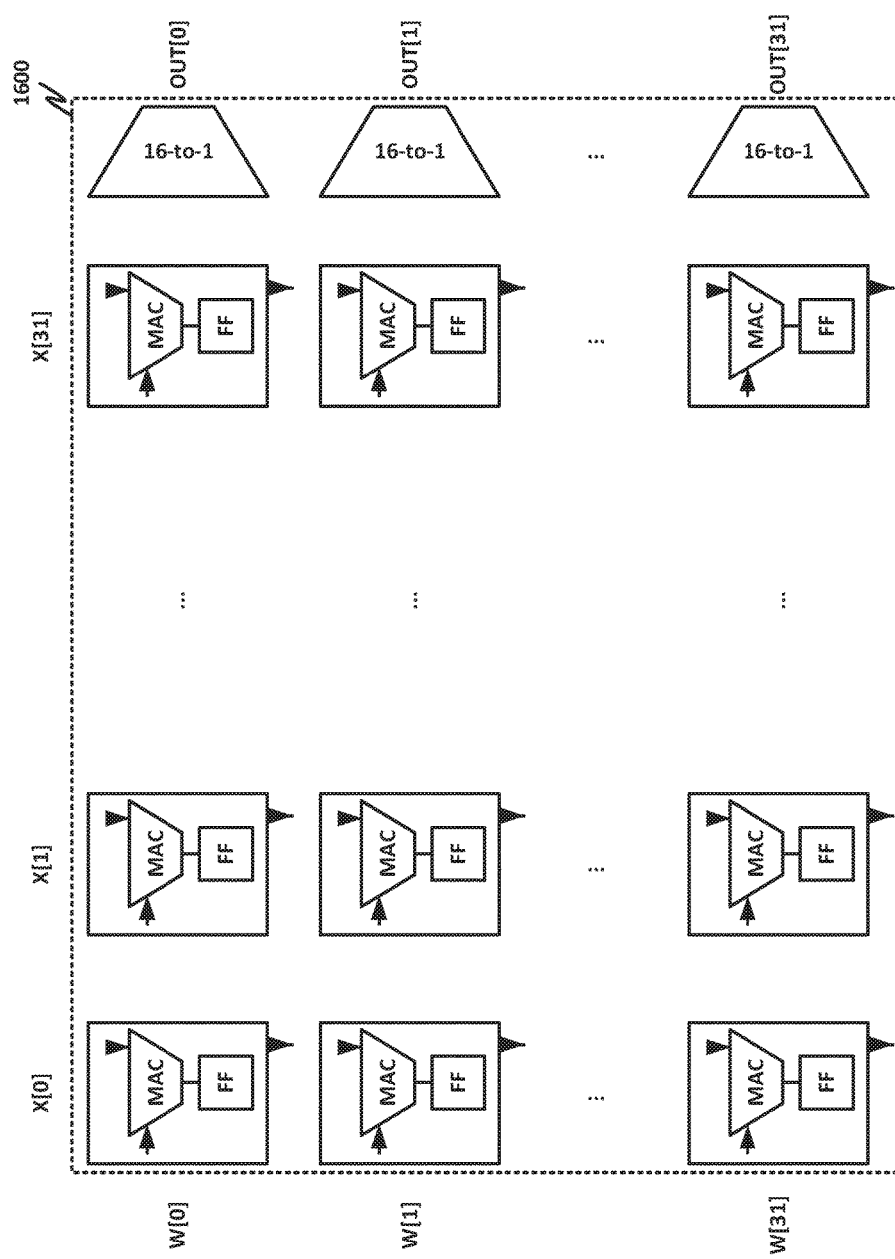
FIG. 16 is a block diagram showing select elements of an adder tree according to one or more examples of the present specification.

FIG. 16 is a block diagram showing select elements of an adder tree 1600 according to one or more examples of the present specification. As used throughout FIG. 16, and throughout the figures, X represents an input datum, also known as an input feature map, such as for a neural network. W represents a weight datum, also known as weights or coefficients, such as for a neural network.

As used throughout FIG. 16 in the specification, X is a 32 element array of input data, and W is a 32 element array of weights. Each input datum in the array X is to be multiplied by each weight in array W.

As illustrated in FIG. 16, in one example, this may be accomplished with an adder tree. With reference to BVF, the operation that is accelerated is "B·X," or in other words, the binary matrix of weight B multiplied by input matrix X. In many examples, this is the primary operation that accounts for on the order of 99% of the processor cycles and energy consumed in a BVF product, as compared to the remaining inner vector products with vector s.

The hardware accelerators disclosed herein may be used to efficiently execute BVF-like matrix products.

Here, four different hardware acceleration techniques are disclosed, in FIGS. 16, 17, 18, and 19, respectively. These four hardware accelerators solutions are presented in decreasing order of both area consumption and power consumption.

In the example of FIG. 16, compute array 1600 includes a two-dimensional array of MACs and flip-flops, with each dimension of the array having 32 elements. Compute array 1600 walks the outer loop such that each cycle's partial results of elements in the array is accumulated. At any given cycle, all inputs X are multiplied with all weights W. In this example, input vector X includes 32 elements of 16 bits each, and weight vector W includes 32 weights of 16 bits each. Thus, compute array 1600 in this example requires 1024 MACs, each of size 16×16.

However, with BVF, the weights are reduced to a single bit vector. This means that the operation performed herein, rather than being a sum of products, becomes a simple sum of numbers, because each weight is either a 0 or a 1.

Figure 17:
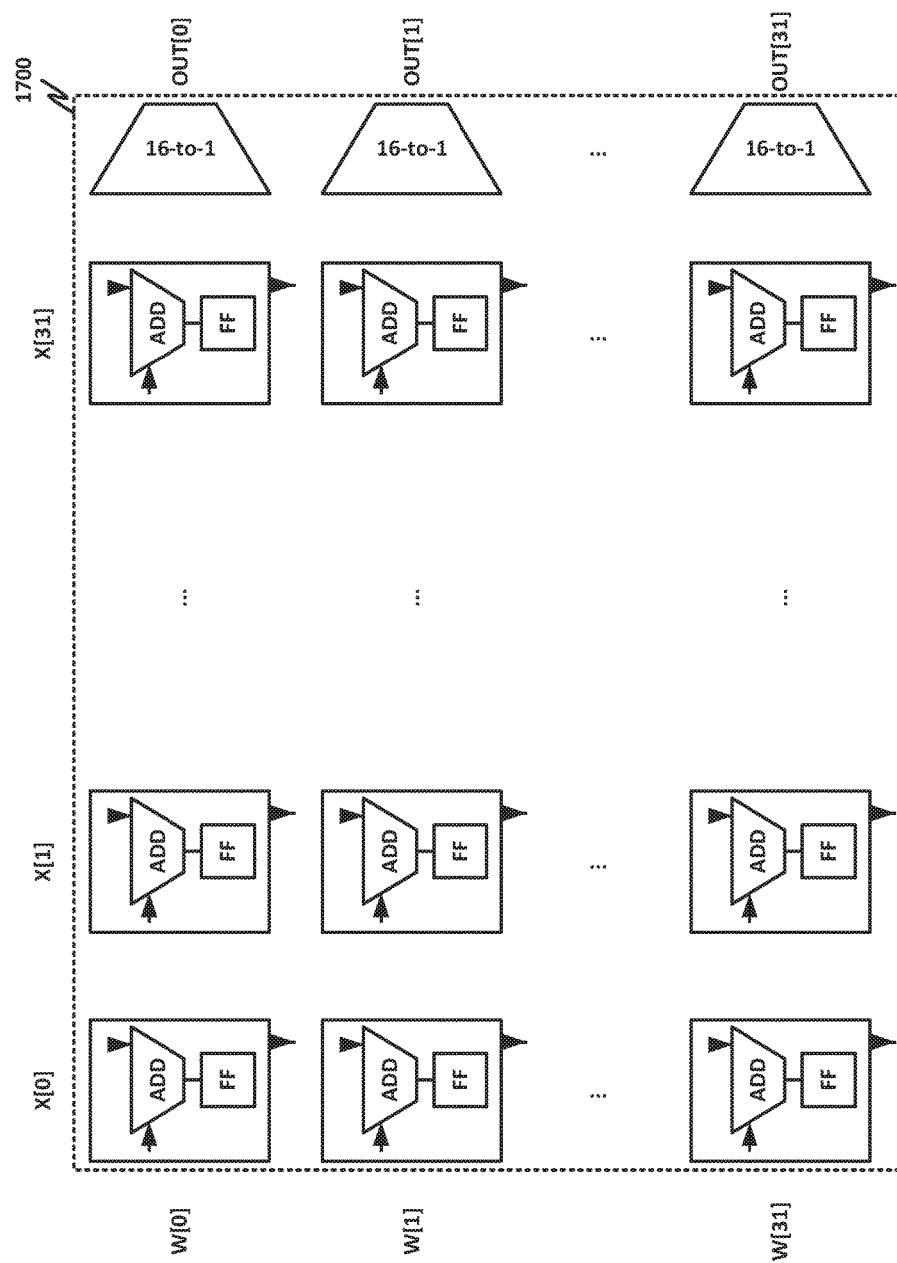
FIG. 17 illustrates an example of a simplified array that is useful in the BVF context according to one or more examples of the present specification.

Thus, FIG. 17 illustrates an example of a simplified array 1700 that is useful in the BVF context. In this case, rather than having an array of 1024 16×16 MACs, a simpler array of 1024 adders may be used in its place. In thus, compute array 1700 realizes energy and space efficiency benefits relative to array 1600 of FIG. 16.

Compute array 1700 of FIG. 17 provides the same overall number of math operations as array 1600 of FIG. 16, but the operations are simpler and consume less energy.

Figure 18:
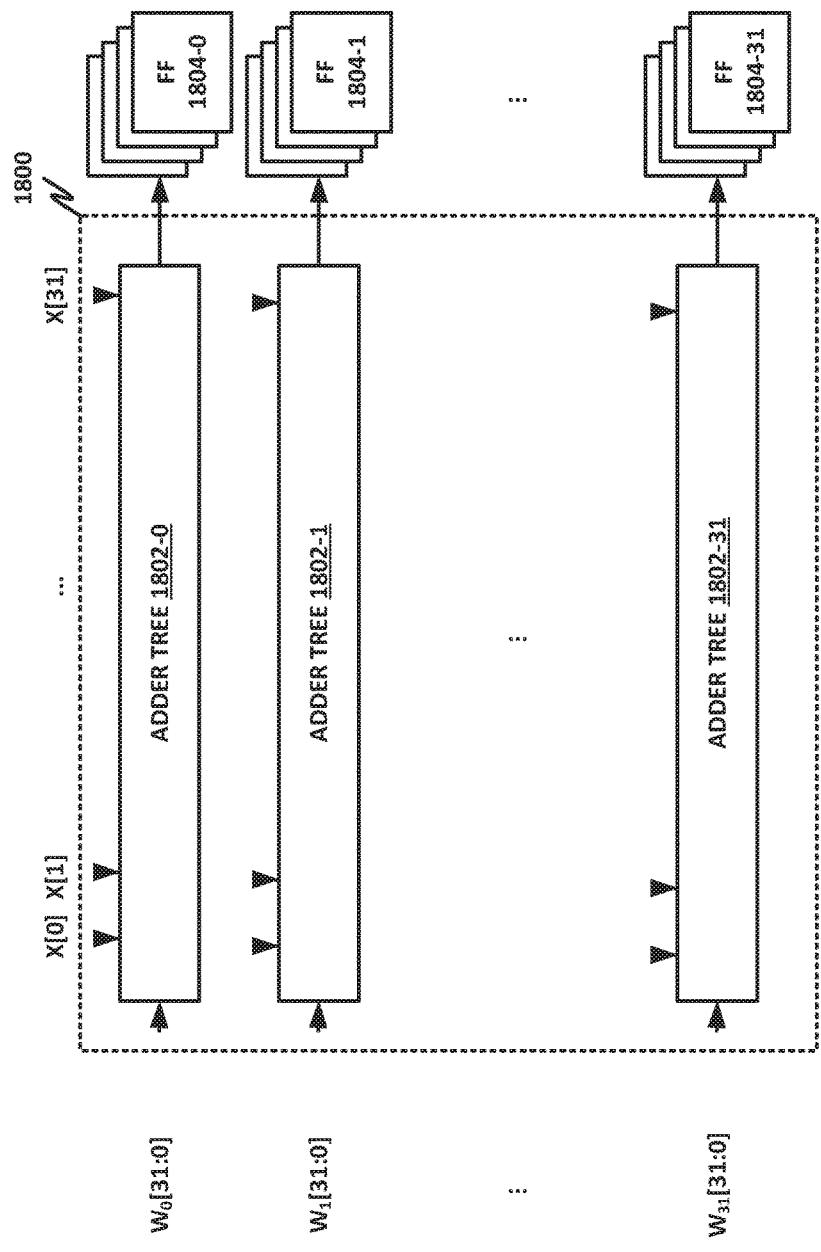
FIG. 18 illustrates a computation that may be further optimized by the use of an adder tree.

However, as illustrated in FIG. 18, the computation may be further optimized by the use of an adder tree 1800.

In the example of adder tree 1800, a tree of 32×32 add operations is used in the adder tree, although the 32-bit size is used solely as a non-limiting example. Each adder tree implements a sum of products of 32 elements, which is actually a conditional sum of 32 elements. The overall sum is:

$$\sum_{i=0}^{31} X_i * W_{31_i}.$$

In this example, adder tree 1800 includes an array of adder trees 1802, each feeding into an array of flip-flops 1804. Each adder tree implements a sum of products of 32 elements, which is actually a conditional sum of 32 elements.

Advantageously, this approach requires only a number of flip-flops per row, rather than having a flip-flop per row and column. Thus, in the example of FIG. 18, there are only 32 flip-flops, versus 1024 flip-flops for the two-dimensional compute array 1700 of FIG. 17. However, the adder tree approach can be even further optimized.

Figure 19:
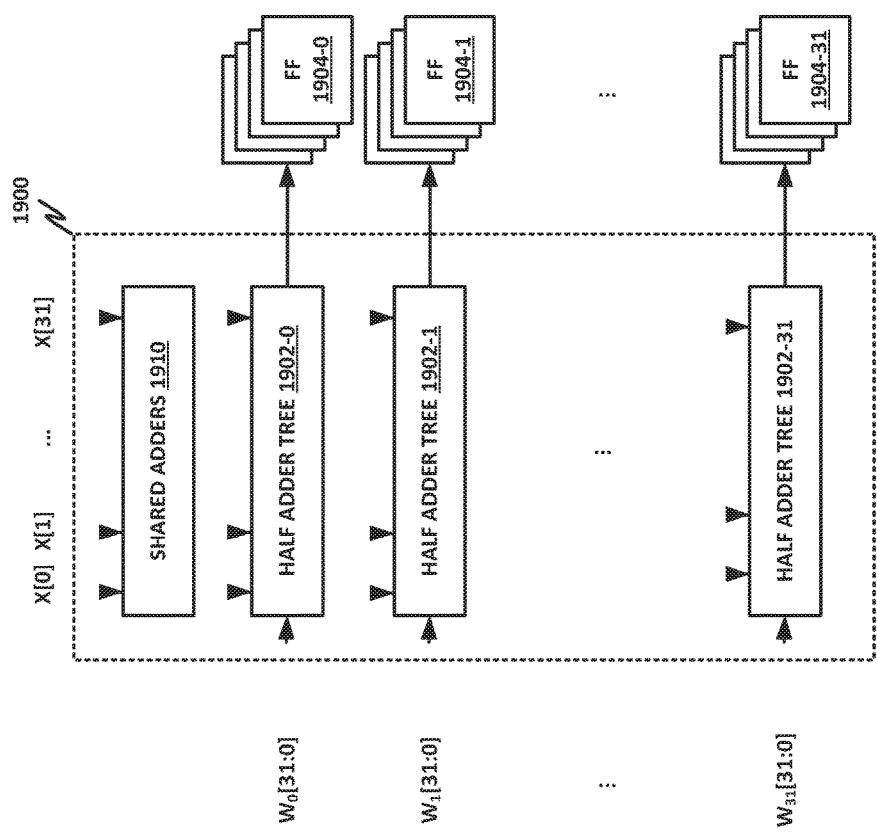
FIG. 19 is a block diagram of a shared adder tree according to one or more examples of the present specification.

FIG. 19 is a block diagram of a shared adder tree 1900 according to one or more examples of the present specification. Again, a 32-bit adder tree is disclosed solely as a non-limiting example, and other sizes of adder trees may be used.

Shared adder tree 1900 represents a further improvement to the adder tree approach. Shared adder tree 1900 takes advantage of the fact that weights are binary and that all adder trees share the same input X. Thus, adder tree 1900 includes shared adder 1910, which includes an array of 16 adders, each of which includes the sum of two consecutive elements of input X. The output of shared adder 1910 is a vector of 16 elements.

Below shared adder 1910, there is an array of 32 half adder trees 1902. One half adder tree 1902 is provided for each row of W. Each half adder tree 1902 includes an adder tree of 16 elements, as compared to an adder tree of 32 elements in adder tree 1800 of FIG. 18.

Figure 20:
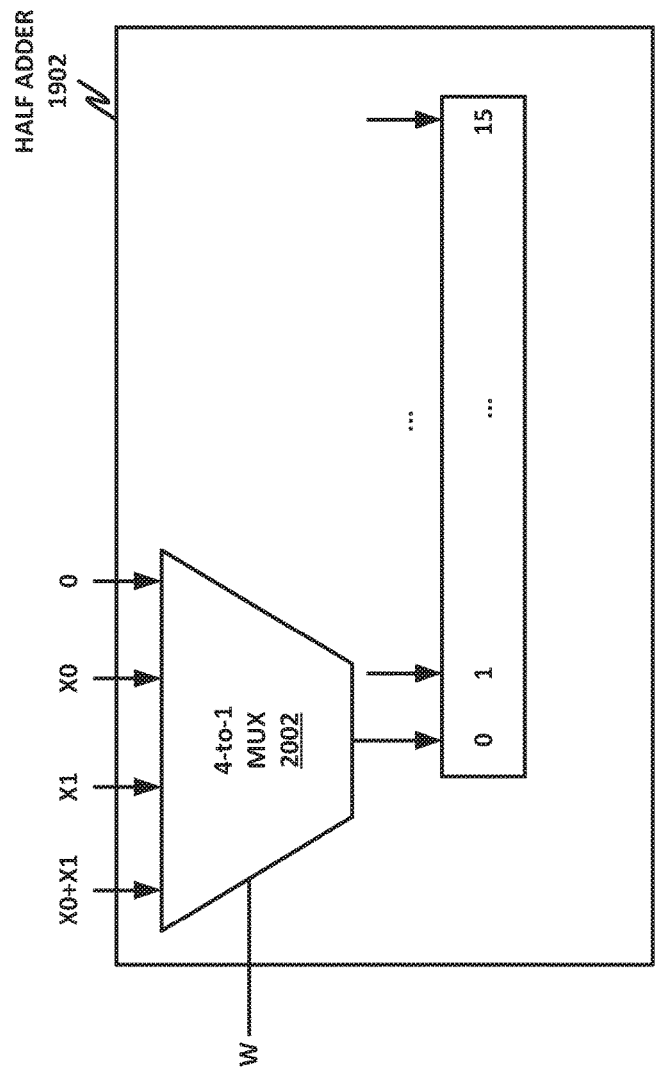
FIG. 20 is a block diagram of selected elements of a half adder according to one or more examples of the present specification.

FIG. 20 is a block diagram of selected elements of a half adder 1902 according to one or more examples of the present specification. As can be seen in FIG. 19, each input of half adder tree 1902 may include a four to one MUXs at the input. These MUXs select one of four possible options, namely $X_0+X_1$, $X_1$, $X_0$, or 0, selected from the two neighboring inputs that depend on the combination of incoming bits of the corresponding weights (00, 10, 01, and 11 respectively).

Advantageously, shared adder tree 1900 of FIG. 19 reduces the number of adders by almost half with respect to adder tree 1800 of FIG. 18, because shared adder tree 1900 reuses the outputs of shared adder 1910.

FIG. 21 is a flowchart of an overall BVF method according to one or more examples of the present specification. Matrix unit 1408 of FIG. 14 receives an input weight matrix W, and if necessary, vectorizes the matrix to vector w.

In block 2102, matrix unit 1408 selects an initial vector s (the dictionary vector), which is a vector of numbers, including floating point numbers. The initial conditions for s are (min(s), max(s))≅(min(w), max(w)). In other words, the minimum and maximum of s are the same as the minimum and maximum of w. For example, if the range of w is between −4 and 8, then vector s has the same range of −4 to 8. The length of vector s is n<<N.

In block 2104, matrix unit 1408 sorts vector w, yielding the sorted $w_0$.

In block 2106, matrix unit 1408 sets the indices of $w_0$ in vector d (i.e. $w_0(i)=w(d_i)$). Vector d is a vector of the indices of the sorted values. For example, if vector w=[15,5,20], then after sorting $w_0$=[5,15,20] and d=[2,1,3]. (Note that throughout this specification, an index into a vector may be showed with any standard notation, including a subscript or a parenthetical.)

In block 2110, matrix unit 1408 finds vector p, which contains (in ascending order) all $2^n$ combinations of possible sums of up to n nonzero unique elements of s. In the example where s=[−4, 8], p=[0, 8, −4, 4].

In block 2112, matrix unit 1408 finds vector v, with length N (which is the same as w). For each element of vector $w_0$ (the ordered weight matrix), matrix unit 1408 fixes the index of p at the minimum $l_1$ norm between $w_0$ and vector p. In other words, for each element of vector $w_o$, search for the element in p having the smallest 1 norm (absolute value of the difference between two elements): take element j of vector p such that to minimize $|w_0(i)-p(j)|$. Since $w_o$ is ordered using binary search, this minimization has logarithmic complexity. Taking as an example p=[0 0; 0 1; 1 0; 1 1]·s=[0, 8, −4, 4], with s=[−4, 8], assume $w_0(3)$=7. The vector of absolute differences with 7 is $\Delta_{p,w_0(3)}$=[7,1,11,3]. Thus, the index 2 (i.e. p(2)=|7−8|=1) is selected for $w_o(3)$. Thus, v(3)=2. Repeat for each value in $w_0$.

In block 2114, $b_i$ the ith line of B is assigned the binary value in v(i): in the previous example p(v(i)=2)=[0 1]· s=8, therefore b(3)=[0 1]

This method corresponds to minimizing ε in $l_1$ in roughly linear time with N, because the number of iterations is N+$2^n$≅N (because n<<N) at most. Using binary search, on average, this method scales with $\log_2(N+2^n)$ (linear in n, and logarithmic in N).

In block 2116, matrix unit 1408 takes a pseudoinverse of B, such as a Penrose-Moore pseudoinverse B*. Note that B may not be strictly or mathematically invertible. Thus, a pseudoinverse may be necessary. This may include minimizing the following quadratic algebraic equation (minimization in $l_2$):

$$\|w_0-B\cdot s\|=(w_0-B\cdot s)^T(w_0-B\cdot s)=w_0^2-2w_0^T B\cdot s+s^T B^T Bs$$

In block 2118, The product B*·w=s is the solution that minimizes the above quadratic form which yields to a new candidate s.

In decision block 2120, matrix unit 1408 iterates until convergence. In other words, if $\|w_0-B\cdot s\|$ is either stationary or is not less than a required threshold for this embodiment, then control returns to block 2110 to iterate again.

If the difference is less than the threshold, then in block 2199, the method returns matrix B which lines are sorted along vector d obtained previously in block 1608.

Experimentally, the results of hardware acceleration between compute array 1600 of FIG. 16, compute array 1700 of FIG. 17, adder tree 1800 of FIG. 18, and shared adder tree 1900 of FIG. 19 were compared.

The following table illustrates the relative performance of each experimental result.

|  | Approach | Peak Ops/ cycle | Area | Efficiency | Gain |
|---|---|---|---|---|---|
| Traditional | TwoD array | 256 | 113109 | 0.0022633 |  |
| BVF | TwoD array | 1024 | 158461 | 0.0064622 | 2.86 |
|  | Adder tree | 1024 | 69079 | 0.0148236 | 6.55 |
|  | Shared adder | 1024 | 54438 | 0.0188104 | 8.31 |

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as industry-leading x86 and x64 architectures by Intel®), but also any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. section 112, as it exists on the date of the filing hereof, unless the words "means for" or "steps for" are specifically used in the particular claims; and (b) does not intend, by any statement in the specification, to limit this disclosure in any way that is not otherwise expressly reflected in the appended claims.

Example Implementations

The following examples are provided by way of illustration.

There is disclosed in one example a processor, comprising: decode circuitry to decode instructions; a data cache unit including circuitry to cache data for the processor; and an approximate matrix multiplication (AMM) circuit comprising: a data receptor circuit to receive a weight vector w and an input vector x, both of size N, and a compression regulating parameter n; a factorizer circuit to factorize w into w≅B·s, by computing a binary factorized matrix B of size N×n, and a dictionary vector s of size n; and a binary multiplier circuit to compute w^T x≅(B·s)^T x=⌈s^T(B⌉^T x), the binary multiplier circuit comprising a hardware accelerator circuit to compute an array product ⌈(B⌉^T x).

There is further disclosed an example of a processor, wherein the hardware accelerator circuit is a two-dimensional array of multiplier accumulators and flip flops to walk an outer loop such that each cycle's partial result of elements is accumulated, and wherein all inputs X are multiplied by all weights W.

There is further disclosed an example of a processor, wherein the hardware accelerator circuit is a two-dimensional array of adders and flip flops to compute a sum of numbers, wherein each weight is a 0 or 1.

There is further disclosed an example of a processor, wherein the hardware accelerator is an adder tree.

There is further disclosed an example of a processor, wherein the adder tree is a full adder tree.

There is further disclosed an example of a processor, wherein the full adder tree is to compute a conditional sum of g elements, of the form $$\sum_{i=0}^{g-1} X_i * W_{g-1_i}.$$

There is further disclosed an example of a processor, wherein the adder tree is a shared adder tree comprising a shared adder block, and an array of half adder trees, wherein the shared adder block is shared by the array of half adder trees.

There is further disclosed an example of a processor, wherein the half adder trees comprise a multiplexed input, wherein weight W selects between X0+X1, X1, X0, and 0.

There is further disclosed an example of a system on a chip (SoC), comprising: a memory; an input/output device; and a core comprising: decode circuitry to decode instructions; a data cache unit including circuitry to cache data for the processor; and a compute unit having an approximate matrix multiplication (AMM) circuit comprising: a data receptor circuit to receive a weight vector w and an input vector x, both of size N, and a compression regulating parameter n; a factorizer circuit to factorize w into w≅B·s, by computing a binary factorized matrix B of size N×n, and a dictionary vector s of size n; and a binary multiplier circuit to compute w ^T x≅(B·s)^T x=⌈s^(B⌈^T x), the binary multiplier circuit comprising a hardware accelerator circuit to compute an array product ⌈B⌈^T x).

There is further disclosed an example of an SoC, wherein the hardware accelerator circuit is a two-dimensional array of multiplier accumulators and flip flops to walk an outer loop such that each cycle's partial result of elements is accumulated, and wherein all inputs X are multiplied by all weights W.

There is further disclosed an example of an SoC, wherein the hardware accelerator circuit is a two-dimensional array of adders and flip flops to compute a sum of numbers, wherein each weight is a 0 or 1.

There is further disclosed an example of an SoC, wherein the hardware accelerator is an adder tree.

There is further disclosed an example of an SoC, wherein the adder tree is a full adder tree.

There is further disclosed an example of an SoC, wherein the full adder tree is to compute a conditional sum of g elements, of the form $$\sum_{i=0}^{g-1} X_i * W_{g-1_i}.$$

There is further disclosed an example of an SoC, wherein the adder tree is a shared adder tree comprising a shared adder block, and an array of half adder trees, wherein the shared adder block is shared by the array of half adder trees.

There is further disclosed an example of an SoC, wherein the half adder trees comprise a multiplexed input, wherein weight W selects between X0+X1, X1, X0, and 0.

There is further disclosed an example of a method of performing approximate matrix multiplication, comprising: receiving a weight vector w and an input vector x, both of size N, and a compression regulating parameter n; factorizing w into w≈B·s, by computing a binary factorized matrix B of size N×n, and a dictionary vector s of size n; and computing w^T x≅(B·s)^T x=[s^T(B] ^T x), comprising computing an array product [(B] ^T x).

There is further disclosed an example of a method, wherein the hardware accelerator circuit is a two-dimensional array of multiplier accumulators and flip flops to walk an outer loop such that each cycle's partial result of elements is accumulated, and wherein all inputs X are multiplied by all weights W.

There is further disclosed an example of a method, wherein the hardware accelerator circuit is a two-dimensional array of adders and flip flops to compute a sum of numbers, wherein each weight is a 0 or 1.

There is further disclosed an example of a method, wherein the hardware accelerator is an adder tree.

There is further disclosed an example of a method, wherein the adder tree is a full adder tree.

There is further disclosed an example of a method, wherein the full adder tree is to compute a conditional sum of g elements, of the form $$\sum_{i=0}^{g-1} X_i * W_{g-1_i}.$$

There is further disclosed an example of a method, wherein the adder tree is a shared adder tree comprising a shared adder block, and an array of half adder trees, wherein the shared adder block is shared by the array of half adder trees.

There is further disclosed an example of a method, wherein the half adder trees comprise a multiplexed input, wherein weight W selects between X0+X1, X1, X0, and 0.

There is further disclosed an example of an apparatus comprising means for performing the method.

There is further disclosed an example of an apparatus, wherein the means for performing the method comprise a processor and a memory.

There is further disclosed an example of an apparatus, wherein the memory comprises machine-readable instructions, that when executed cause the apparatus to perform the method.

There is further disclosed an example of an apparatus, wherein the apparatus is a computing system.

There is further disclosed an example of at least one computer-readable medium comprising instructions that, when executed, implement a method or realize an apparatus.

There is further disclosed an example of an intellectual property (IP) block comprising an approximate matrix multiplication (AMM) circuit, comprising: a data receptor circuit to receive a weight vector w and an input vector x, both of size N, and a compression regulating parameter n; a factorizer circuit to factorize w into w≈B·s, by computing a binary factorized matrix B of size N×n, and a dictionary vector s of size n; and a binary multiplier circuit to compute w^T x≅(B·s)^T x=[s^T(B] ^T x), the binary multiplier circuit comprising a hardware accelerator circuit to compute an array product [(B] ^T x).

There is further disclosed an example of an IP block, wherein the hardware accelerator circuit is a two-dimensional array of multiplier accumulators and flip flops to walk an outer loop such that each cycle's partial result of elements is accumulated, and wherein all inputs X are multiplied by all weights W.

There is further disclosed an example of an IP block, wherein the hardware accelerator circuit is a two-dimensional array of adders and flip flops to compute a sum of numbers, wherein each weight is a 0 or 1.

There is further disclosed an example of an IP block, wherein the hardware accelerator is an adder tree.

There is further disclosed an example of an IP block, wherein the adder tree is a full adder tree.

There is further disclosed an example of an IP block, wherein the full adder tree is to compute a conditional sum of g elements, of the form $$\sum_{i=0}^{g-1} X_i * W_{g-1_i}.$$

There is further disclosed an example of an IP block, wherein the adder tree is a shared adder tree comprising a shared adder block, and an array of half adder trees, wherein the shared adder block is shared by the array of half adder trees.

There is further disclosed an example of an IP block, wherein the half adder trees comprise a multiplexed input, wherein weight W selects between X0+X1, X1, X0, and 0.

What is claimed is:
1. A processor, comprising:
   decode circuitry to decode instructions;
   a data cache unit including circuitry to cache data for the processor; and
   an approximate matrix multiplication (AMM) circuit comprising:
      a data receptor circuit to receive a weight vector w and an input vector x, both of size N, and a compression regulating parameter n;

a factorizer circuit to factorize w into w≅B·s, by computing a binary factorized matrix B of size N×n, and a dictionary vector s of size n; and a binary multiplier circuit to compute $w^T x \cong (B \cdot s)^T x = s^T (B^T x)$, the binary multiplier circuit comprising a hardware accelerator circuit to compute an array product ($B^T x$), wherein the hardware accelerator circuit is one of a two-dimensional array of multiplier accumulators and flip flops, a two-dimensional array of adders and flip flops, or an adder tree.

2. The processor of claim 1, wherein the hardware accelerator circuit is a two-dimensional array of multiplier accumulators and flip flops to walk an outer loop such that each cycle's partial result of elements is accumulated, and wherein all inputs X are multiplied by all weights W.

3. The processor of claim 1, wherein the hardware accelerator circuit is a two-dimensional array of adders and flip flops to compute a sum of numbers, wherein each weight is a 0 or 1.

4. The processor of claim 1, wherein the hardware accelerator is an adder tree.

5. The processor of claim 4, wherein the adder tree is a full adder tree.

6. The processor of claim 5, wherein the full adder tree is to compute a conditional sum of g elements, of the form $$\sum_{i=0}^{g-1} X_i * W_{g-1_i}.$$

7. The processor of claim 4, wherein the adder tree is a shared adder tree comprising a shared adder block, and an array of half adder trees, wherein the shared adder block is shared by the array of half adder trees.

8. The processor of claim 7, wherein the half adder trees comprise a multiplexed input, wherein weight W selects between X0+X1, X1, X0, and 0.

9. A system on a chip (SoC), comprising:
a memory;
an input/output device; and
a core comprising:
  decode circuitry to decode instructions;
  a data cache unit including circuitry to cache data for the processor; and
  a compute unit having an approximate matrix multiplication (AMM) circuit comprising:
    a data receptor circuit to receive a weight vector w and an input vector x, both of size N, and a compression regulating parameter n;
    a factorizer circuit to factorize w into w≅B·s, by computing a binary factorized matrix B of size N×n, and a dictionary vector s of size n; and
    a binary multiplier circuit to compute $w^T x \cong (B \cdot s)^T x = s^T (B^T x)$, the binary multiplier circuit comprising a hardware accelerator circuit to compute an array product ($B^T x$), wherein the hardware accelerator circuit is one of a two-dimensional array of multiplier accumulators and flip flops, a two-dimensional array of adders and flip flops, or an adder tree.

10. The SoC of claim 9, wherein the hardware accelerator circuit is a two-dimensional array of multiplier accumulators and flip flops to walk an outer loop such that each cycle's partial result of elements is accumulated, and wherein all inputs X are multiplied by all weights W.

11. The SoC of claim 9, wherein the hardware accelerator circuit is a two-dimensional array of adders and flip flops to compute a sum of numbers, wherein each weight is a 0 or 1.

12. The SoC of claim 9, wherein the hardware accelerator is an adder tree.

13. The SoC of claim 12, wherein the adder tree is a full adder tree.

14. The SoC of claim 13, wherein the full adder tree is to compute a conditional sum of g elements, of the form $$\sum_{i=0}^{g-1} X_i * W_{g-1_i}.$$

15. The SoC of claim 12, wherein the adder tree is a shared adder tree comprising a shared adder block, and an array of half adder trees, wherein the shared adder block is shared by the array of half adder trees.

16. The SoC of claim 15, wherein the half adder trees comprise a multiplexed input, wherein weight W selects between X0+X1, X1, X0, and 0.

17. A method of performing approximate matrix multiplication, comprising:
receiving, by a data receptor circuit, a weight vector w and an input vector x, both of size N, and a compression regulating parameter n;
factorizing, by a factorizer circuit, w into w≅B·s, by computing a binary factorized matrix B of size N×n, and a dictionary vector s of size n; and
computing $w^T x \cong (B \cdot s)^T x = s^T (B^T x)$ by a binary multiplier circuit, the binary multiplier circuit comprising a hardware accelerator circuit to compute an array product ($B^T x$), wherein the hardware accelerator circuit is one of a two-dimensional array of multiplier accumulators and flip flops, a two-dimensional array of adders and flip flops, or an adder tree.

18. The method of claim 17, wherein the hardware accelerator circuit is a two-dimensional array of multiplier accumulators and flip flops to walk an outer loop such that each cycle's partial result of elements is accumulated, and wherein all inputs X are multiplied by all weights W.

19. The method of claim 17, wherein the hardware accelerator circuit is a two-dimensional array of adders and flip flops to compute a sum of numbers, wherein each weight is a 0 or 1.

20. The method of claim 17, wherein the hardware accelerator is an adder tree.

21. The method of claim 20, wherein the adder tree is a full adder tree.

22. The method of claim 21, wherein the full adder tree is to compute a conditional sum of g elements, of the form $$\sum_{i=0}^{g-1} X_i * W_{g-1_i}.$$

23. The method of claim 20, wherein the adder tree is a shared adder tree comprising a shared adder block, and an array of half adder trees, wherein the shared adder block is shared by the array of half adder trees.

24. The method of claim 23, wherein the half adder trees comprise a multiplexed input, wherein weight W selects between X0+X1, X1, X0, and 0.

* * * * *